United States Patent
Schwartz

(10) Patent No.: US 11,443,133 B2
(45) Date of Patent: Sep. 13, 2022

(54) COMPUTER VISION SYSTEM FOR INDUSTRIAL EQUIPMENT GAUGE DIGITIZATION AND ALARMS

(71) Applicant: Edward L. Schwartz, Sunnyvale, CA (US)

(72) Inventor: Edward L. Schwartz, Sunnyvale, CA (US)

(73) Assignee: RICOH COMPANY, LTD., Tokyo (JP)

( * ) Notice: Subject to any disclaimer, the term of this patent is extended or adjusted under 35 U.S.C. 154(b) by 289 days.

(21) Appl. No.: 16/709,035

(22) Filed: Dec. 10, 2019

(65) Prior Publication Data

US 2021/0174131 A1 Jun. 10, 2021

(51) Int. Cl.
*G06K 9/62* (2022.01)
*G06N 3/08* (2006.01)
*G06N 3/04* (2006.01)
*G06V 10/98* (2022.01)

(52) U.S. Cl.
CPC .......... *G06K 9/623* (2013.01); *G06K 9/6259* (2013.01); *G06N 3/0454* (2013.01); *G06N 3/088* (2013.01); *G06V 10/98* (2022.01); *G06V 2201/02* (2022.01)

(58) Field of Classification Search
CPC ........ G06K 9/623; G06K 9/6259; G06K 9/03; G06K 2209/03; G06K 9/6271; G06N 3/088; G06N 3/0454
See application file for complete search history.

(56) References Cited

U.S. PATENT DOCUMENTS

| | | | |
|---|---|---|---|
| 8,319,665 B2 | 11/2012 | Weinmann et al. | |
| 8,594,365 B2 | 11/2013 | Derkalousdian et al. | |
| 9,135,492 B2 | 9/2015 | Gellaboina et al. | |
| 10,108,874 B2 | 10/2018 | Petruk | |
| 2013/0069948 A1* | 3/2013 | Dembo | G06T 11/206 345/440 |
| 2017/0089692 A1 | 3/2017 | Chattopadhyay et al. | |

FOREIGN PATENT DOCUMENTS

CN 108764229 11/2018

OTHER PUBLICATIONS

Machine Learning in Practice, Yang, Jun. 2019; https://objectcomputing.com/resources/publications/sett/june-2019-using-machine-learning-to-read-analog-gauges (Year: 2019).*

(Continued)

*Primary Examiner* — Jianxun Yang
(74) *Attorney, Agent, or Firm* — Patent Law Works LLP

(57) ABSTRACT

A system for analog gauge monitoring uses a machine learning model for computer vision that is trained using synthetic training data generated based on one or a few images of the gauge being monitored and a geometric model describing the scale and the indicator of the gauge. In some embodiments, the synthetic training data is generated using an image model implemented as a generative adversarial network (GAN) type neural network and trained to modify an image of a given gauge such that the gauge face is preserved while the gauge indicator is added to or removed from the image of the given gauge for any given gauge.

20 Claims, 18 Drawing Sheets

(56) References Cited

OTHER PUBLICATIONS

Generating New Watch Designs With StyleGAN, Pfeil, Jun. 2019; https://evigio.com/post/generating-new-watch-designs-with-stylegan (Year: 2019).*
Chi et al., "Machine Vision Based Automatic Detection Method of Indicating Values of a Pointer Gauge," Mathematical Problems in Engineering, Oct. 2015, 19 pgs.
github.com, "Analog Gauge Reader," retrieved from https://github.com/intel-iot-devkit/python-cv-samples/tree/master/examples/analog-gauge-reader on Dec. 9, 2019, 3 pgs.
Tian et al., "A pointer location algorithm for computer visionbased automatic reading recognition of pointer gauges," Open Phys., vol. 17, Jan. 1, 2019, pp. 86-92.
Yang, "Machine Learning in Practice: Using Artificial Intelligence to Read Analog Gauges," Jun. 2019, available at https://objectcomputing.com/resources/publications/sett/june-2019-using-machine-learning-to-read-analog-gauges, 9 pgs.

* cited by examiner

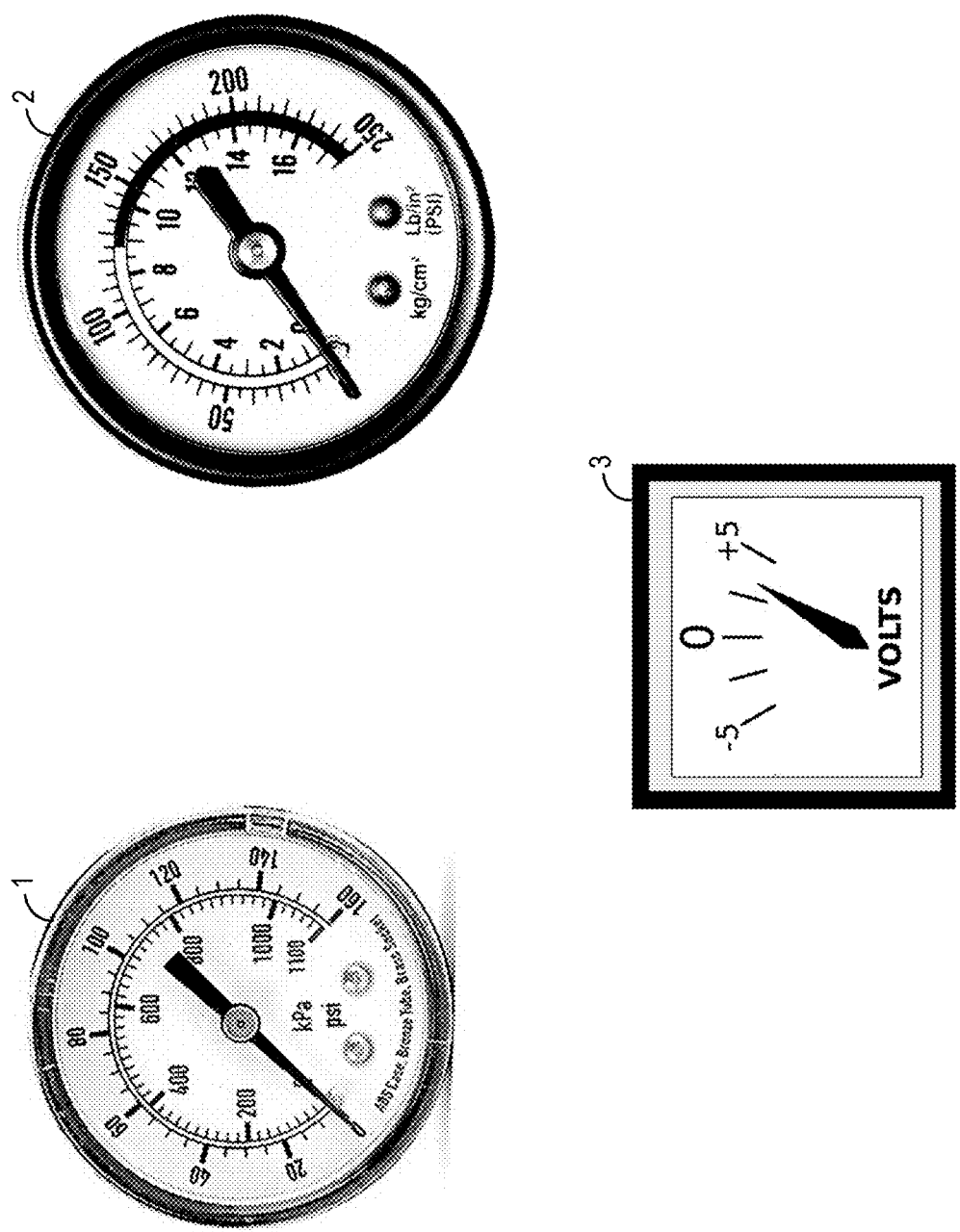

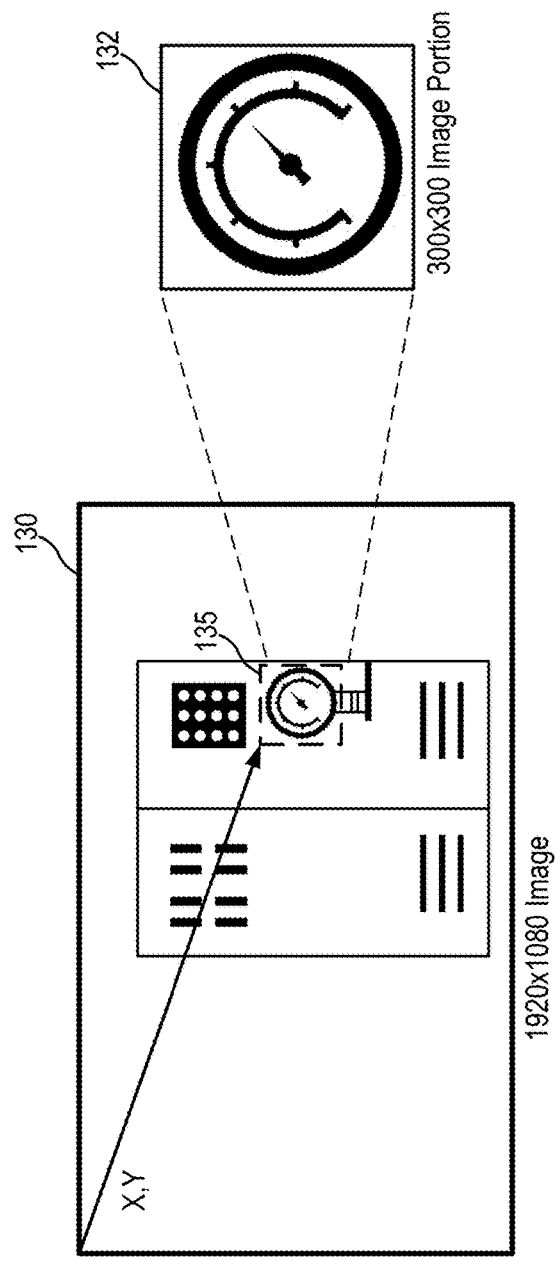
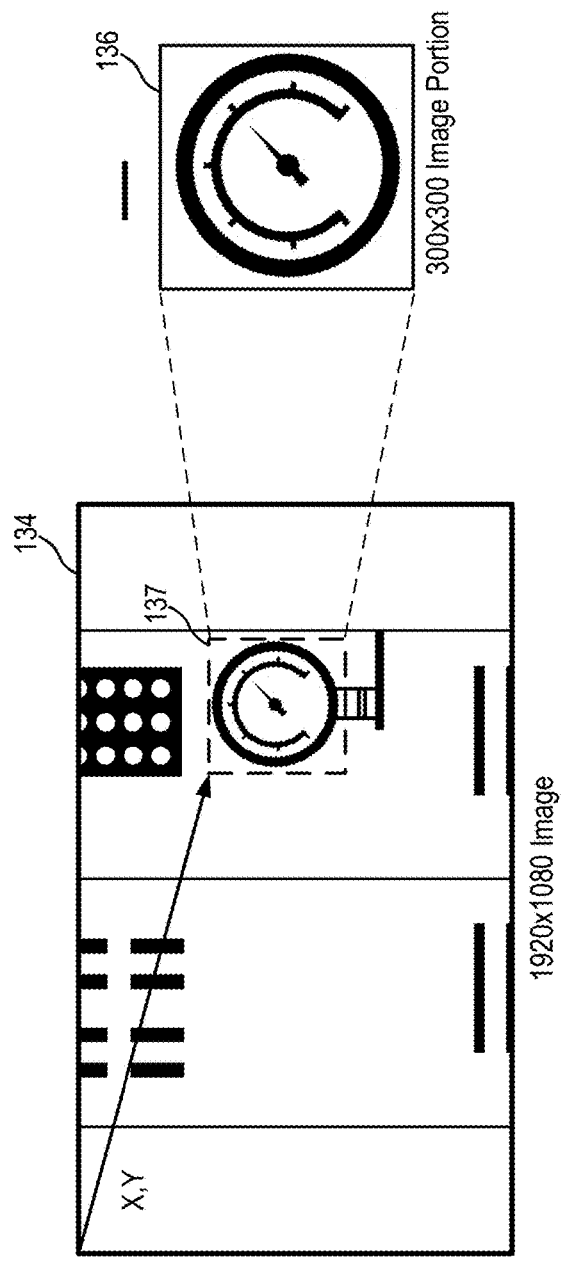
Fig. 5(a)
Fig. 5(b)

Annotate

Generator G

```
def generator(inputs, reference, targets):
    with tf.variable_scope('generator'):
        inputs_reference = tf.concat([input_data, reference], -1)
        input_with_condition = ops.condition_input_with_pixel_padding(inputs_reference, targets)
        down_sample = layers.generator_down_sample(input_with_condition)
        bottleneck = layers.generator_bottleneck(down_sample)
        up_sample = layers.generator_up_sample(bottleneck, 3)
    return up_sample
```

Where:
inputs - a batch of one or more input patches
reference - a batch of one or more patches with an Indicator corresponding to each patch in inputs
targets - the Domain (e.g. Erase or Draw) corresponding to each patch in inputs
concat- Concatenates vectors condition_input_with_pixel_padding - combines the result of concat (input patches and indicator patches) with the Domain and adds any padding required by the network generator_down_sample - The first part of the Generator which downsamples
generator_bottleneck - The middle part of the Generator
generator_up_sample - The last part of the Generator which upsamples.

Figure 13

| | Training cases (different domain combinations) | | | |
|---|---|---|---|---|
| Domain₁ (random choice) | draw | draw | erase | erase |
| Domain₂ (match random input patch) | draw | erase | draw | erase |
| Patches₁ (input patch) | Patches without Indicator | Patches with Indicator | Patches with Indicator | Patches without Indicator |
| Patches₂ (match Domain₁) | Patches with Indicator | Patches with Indicator | Patches without Indicator | Patches without Indicator |
| Face loss | L1 loss | L1 loss | L1 loss | L1 loss |
| Mask₁ | Dilated Indicator mask | Dilated Indicator mask | Dilated Indicator mask | Dilated Indicator mask |
| Indicator only loss | L1 loss with translation invariance | L1 loss with translation invariance | L1 loss with translation invariance | 0 |
| Mask₂ | Pixel accurate indicator mask | Pixel accurate indicator mask | Pixel accurate indicator mask | Mask₁ not used |
| Reference₁ | Scaled and aligned reference (example) indicator patch | Scaled and aligned reference (example) indicator patch | Scaled and aligned reference (example) indicator patch | Reference₁ not used |
| Reference₂ | Scaled and aligned reference (example) indicator patch | Scaled and aligned reference (example) indicator patch | Scaled and aligned reference (example) indicator patch | All zeros |
| Reference₃ | All zeros | Scaled and aligned reference (example) indicator patch | Scaled and aligned reference (example) indicator patch | All zeros |

Figure 15

COMPUTER VISION SYSTEM FOR INDUSTRIAL EQUIPMENT GAUGE DIGITIZATION AND ALARMS

FIELD OF THE INVENTION

The invention relates to analog gauge digitization and, in particular, to a method for generating a training data set to enable analog gauge digitization and alarms.

BACKGROUND OF THE INVENTION

Factories and industrial facilities employ machines that use analog gauges or meters for measuring or monitoring of parameters of the environment or of the operation states of the machines. These gauges or meters often have to be read manually by a human operator as the gauges either have no digital output or that have a digital output that is not supported by the user's hardware or software. For instance, legacy industrial machines, such as auxiliary machines or auxiliary industrial equipment that are used with a main machine, often use analog gauges to measure and display parameters relating to the machine or to the environment in which the machine is installed. Examples of uses of industrial analog gauges can be found on heat transfer equipment (e.g. chillers), robots, conveyors, grinders, crushers, pelletizing equipment, water tanks, hopper loaders, dryers, gravimetric feeders, and others. An industrial process might have a "main" machine (such as an injection molding machine or other molding/extrusion machine) and one or more auxiliary machines (such as an air cooled chiller). While a "main" machine might be digitally connected so it can be monitored electronically, digitally connecting the auxiliary machines (e.g. from different manufacturers) associated with the main machine is a challenge.

Automation of gauge reading or gauge monitoring is sometimes desired. Systems and methods to digitize the monitoring of analog gauges have been described. Prior solutions to digitize monitoring of analog gauges involve capturing digital images of a gauge and using machine learning based computer vision to read the images to determine the gauge reading. Prior solutions using computer vision based approaches require significant per-gauge customization (e.g. manually separating the gauge face and indicator) that are uneconomical for commercial use at scale.

Furthermore, dataset collection is an essential part of training machine learning models for gauge monitoring. Machine learning based computer vision requires training data that is representative of the possible input images. That is, to train an effective model, the dataset must contain images of a gauge dial at multiple possible indicator positions over the range of the gauge parameter scale. Manually creating gauge images for every indicator position by physically manipulating the indicator position is tedious and may be infeasible in many cases.

For example, some gauges have a normal operation region and an out-of-normal operation region. Operating the machine so that the gauge is in the out-of-normal operation region to gather training images might be difficult to do, may damage the machine, or may violate procedures/regulations/laws, and/or be dangerous. In other examples, having the gauge go through its entire normal operation region might take a long time, requiring a large amount of resource and/or be costly.

SUMMARY OF THE INVENTION

The present disclosure discloses an apparatus and method for a gauge monitoring computer vision system, substantially as shown in and/or described below, for example in connection with at least one of the figures, as set forth more completely in the claims.

In some embodiments, a method for monitoring a gauge having a face including markings denoting a scale for a parameter value being measured by the gauge and an indicator indicating a reading of the parameter value over the scale by displacement of the indicator on the face includes receiving a set of training images of the gauge; receiving data relating to annotations of the training images of the gauge, the annotations denoting the scale and the indicator on the face of the gauge; generating a geometric model describing the gauge using geometric information derived from the data relating to the annotations; providing an image model previously trained to modify an image of a given gauge such that the gauge face is preserved while the gauge indicator is added to or removed from the image of the given gauge for any given gauge; generating, using the geometric model and the trained image model, synthetic images of the gauge, the synthetic images having indicator at different positions relative to the scale, the synthetic images forming a training data set; training a machine learning model for computer vision using the training data set; receiving operation images of the gauge during normal operation of the gauge; and applying the trained machine learning model for computer vision to the operation images to predict readings of the gauge.

Other aspects include corresponding methods, systems, apparatuses, and computer program products for these and other innovative aspects.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the techniques described.

BRIEF DESCRIPTION OF THE DRAWINGS

Various embodiments of the invention are disclosed in the following detailed description and the accompanying drawings.

FIG. 1 illustrates example analog gauges to which digital monitoring may be desired.

FIG. 2, which includes

FIG. 5, which includes FIGS. 5(a) and 5(b), illustrates the crop and scale process in some examples.

FIG. 6, which includes

FIG. 9, which includes

FIG. 13 illustrates the pseudocode fragment illustrating an implementation for the generator G in some examples.

FIG. 14, which includes

FIG. 15 is a table illustrating the training cases for the GAN image model in some embodiments.

DETAILED DESCRIPTION

Figure 2A:
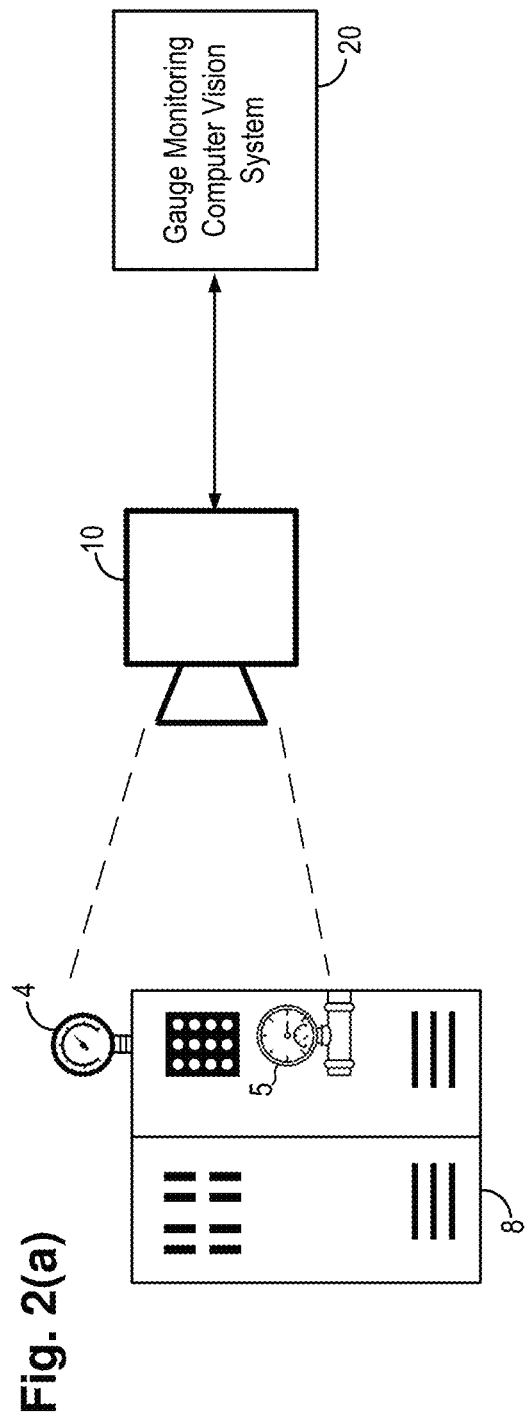
FIGS. 2(a) and 2(b), illustrates a system environment in which the gauge monitoring computer vision system may be implemented.

According to embodiments of the present disclosure, a computer vision system for analog gauge monitoring uses a machine learning model that is trained using synthetic training data generated based on one or a few images of the gauge being monitored and a geometric model describing the scale and the indicator of the gauge. In some embodiments, the synthetic training data is generated using an image model implemented as a generative adversarial network (GAN) type neural network and trained using a mask to distinguish the gauge indicator from the gauge background (or the face of the gauge). Furthermore, in some embodiments, the trained GAN image model is used to erase the indicator from or draw the indicator onto the gauge background to generate a set of synthetic images to use as the synthetic training data. The gauge monitoring computer vision system of the present disclosure realizes advantages over prior solutions by training the system using synthetic training data generated for all or substantially all possible gauge values using only one or a few actual images of the gauge to be monitored and requiring only low human effort to annotate the images to provide the geometric model.

As thus trained, the gauge monitoring computer vision system, with the trained machine learning model, can be applied to monitor the gauge in operation. In particular, the gauge monitoring computer vision system receives an operation image indicative of a current condition or current reading of the gauge in operation. The gauge monitoring computer vision system generates an output predicting the current reading or the current condition of the gauge using the trained machine learning model. In some instances, the gauge monitoring computer vision system generates an output being a binarization of the gauge parameter values. The output maybe an abstract indicator value proportional to the gauge scale (e.g. 0 to 1) or the output can be mapped to the real-world physical parameter value being measured by the gauge. In yet other embodiments, the gauge monitoring computer vision system can generate an alarm based on the current reading of the gauge being above or below a given threshold. In other words, the gauge monitoring computer vision system uses the trained machine learning model to read gauge values from images of the gauge in operation and can provide an output being a parameter value of the gauge or a condition of the gauge being above or below a threshold.

In the present description, a digital twin refers to a digital replica of a physical object such as an industrial machine. The digital replica can be a virtual or cyber replica. Data is transmitted from the physical object so that the state of the digital replica stays synchronized with its corresponding physical entity. In some examples, the value of gauges on an industrial machine can represent the machine's state in an analog fashion. Converting this analog state to digital form using computer vision enables the creation of a digital twin for the industrial machine. The digital representation used by a digital twin, in addition to state provided by gauges, might also include information about the elements and dynamics of how physical entity (the industrial machine) operates or about conditions of interest. In embodiments of the present disclosure, the gauge monitoring computer vision system is used to implement a digital twin for industrial analog gauges to monitor gauge readings and/or provide alerts when the gauge reading indicates certain conditions.

In the present description, a gauge, also referred to as a meter, refers to a device that measures a parameter and indicates on a scale a quantity or condition associated with the parameter. FIG. 1 illustrates example analog gauges to which digital monitoring may be desired. Analog gauges are often used to measure physical parameters, such as temperature, pressure, voltage or current. Referring to FIG. 1, examples of pressure gauges 1 and 2, and an example of a voltmeter 3 are shown. An analog gauge includes a face being the background of the gauge with markings thereon indicating a scale for a parameter to be measured by the gauge. The scale has a minimum value and a maximum value, forming a range of parameter values to be measured by the gauge. The analog gauge also includes an indicator, typically in the form of a needle, that is calibrated to move in response to changes in the given parameter. The scale indicate the range of possible indicator movement, from the minimum parameter value to the maximum parameter value.

The indicator moves relative to the scale on the face of the gauge. The indicator may move radially around a center point, as shown by the example gauges 1-3 in FIG. 1. In other examples, a gauge may include an indicator that moves along a straight line, such as a level indicator in a fluid level gauge. In the case the indicator moves radially, the scale is in the form of a circular arc and the reading values of the indicator is linear in nature with respect to the deflection angle of the indicator. In the case the indicator moves along a straight line, the scale is in the form of a line and the reading values of the indicator is linear in nature with respect to the displacement position of the indicator. The scale may be marked on the face of the gauge using various style of markings and the specific scale marking style or indicator needle type is not critical to the practice of the present disclosure. For a fluid level gauge where a fluid is visible in a transparent pipe, a gas flow gauge where a ball moves in a transparent pipe or a material level gauge where a material is visible through a transparent window in a container, the top of the material, ball or top of the fluid is the indicator, the transparent pipe or window is the face and the bottom and top of the transparent pipe or window are the markings of the minimum and maximum of the scale if there are no other explicit markings.

In some examples, the analog gauge is a pressure gauge used to measure air pressure or fluid pressure. For example, pressure gauge 1 provides a pressure reading value in kPa unit and in psi unit. The pressure gauge has a scale with a parameter range from 0 psi to 160 psi. In another example, a pressure gauge may further indicate a region of normal operation and a region of out-of-normal operation, as shown by pressure gauge 2 where a colored bar from 125 PSI to 250 PSI indicates out-of-normal operation. In other examples, the gauge may indicate a threshold vale, such as 125 psi. In the example of the voltmeter 3, the voltmeter includes a scale of −5V to +5V.

In embodiments of the present disclosure, the gauge monitoring computer vision system is applied to binarize an analog gauge by providing output values indicative of the readings of the gauge, as captured by images of the gauge in operation. In some embodiment, the gauge monitoring computer vision system generates an output being a dimensionless floating point value, such as from 0.0 to 0.1. For example, an output value of 0.0 corresponds to the minimum indicator value on the gauge scale and an output value of 1.0 to the maximum indicator value on the gauge scale. In other embodiments, the gauge monitoring computer vision system maps the floating point output value to the parameter value being measured by the scale and provides real-world physical parameter value as output. In the present disclosure, digitization of the analog gauge refers to generating a digital output indicative of readings of the analog gauge. In the present disclosure, gauge alarms refers to generating an indication of a condition of the gauge, such as when the gauge reading is above or below a threshold. The indication is sometimes referred to as an alert or an alarm.

In some cases, a gauge may include more than one indicator and corresponding scale. In embodiments of the present disclosure, the gauge monitoring computer vision system treats each set of indicator and corresponding scale as separate gauges, each gauge with one indicator and the associated scale.

Figure 2B:
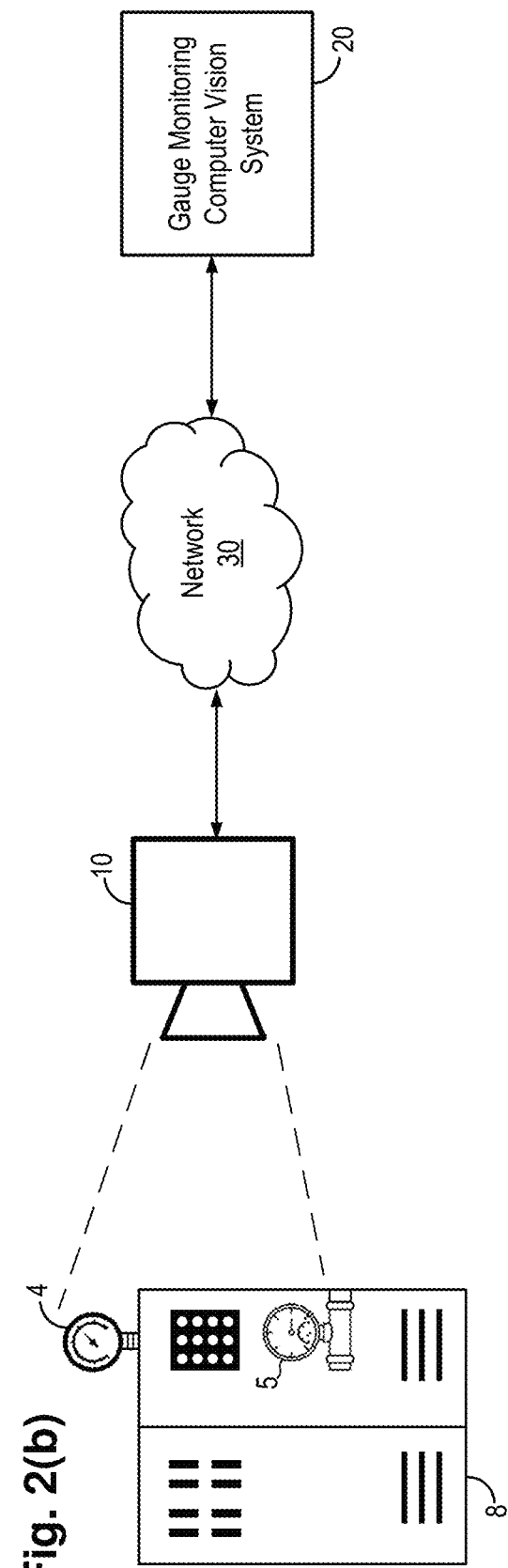

FIG. 2, which includes FIGS. 2(a) and 2(b), illustrates a system environment in which the gauge monitoring computer vision system may be implemented. Referring to FIG. 2, a gauge monitoring computer vision system 20 of the present disclosure is disposed to monitor one or more analog gauges 4, 5, such as analog gauge that are configured as part of an industrial machine 8. The gauge monitoring computer vision system 20 receives images of the analog gauges 4, 5 as input. For example, one or more digital cameras 10 may be used to observe the gauges 4, 5. A salient feature of the computer vision system the present invention is that the computer vision system is trained using only one or a few annotated images of the gauge. The system 20 generates synthetic training data using a geometric model derived from the annotation data and a previously trained image model and the few images of the gauge. As thus trained, the system 20 receives images of the gauges 4, 5 in operation and provide output indicative of the current reading of the gauge. In some examples, the system 20 may provide an output value converted to the real-world parameter value to binarize the gauge being monitored. In other examples, the system 20 may provide alarm notifications in response to the gauge reading being above or below a given threshold.

The gauge monitoring computer vision system 20 can be implemented at the edge, such as on location with the gauges to be monitored, as shown in FIG. 2(a). Alternately, the gauge monitoring computer vision system 20 can be implemented remotely from the gauges to be monitored, as shown in FIG. 2(b). The image capture device 10, or other computing device in communication with camera 10, can be configured to communicate with system 20 over a data network 30. Images captured by the image capture device 10 is transmitted to system 20 over the data network 30. In other embodiments, certain image processing functions may be performed at the image capture device 10 before the images are transmitted to system 20 over the data network 30, as will be described in more detail below.

In the present disclosure, the image capture device 10 may be a digital camera providing a still image or video digital output including the gauge with resolution sufficient to capture the indicator on the gauge. In some examples, the camera 10 and the gauges 4,5 are fixed in position, e.g., affixed either to the machine or building containing the machine. Preferably, the relative position of the gauge 4 or 5 and the camera 10 is not required to be pixel accurate. In some embodiments, the computer vision system 20 has a tolerance for modest position differences, such as up to 5% or up to 10% of the size of the gauge.

In some embodiments, a single camera can be used to capture images of multiple gauges. In other embodiments, a camera may be configured to capture images of a gauge periodically, such as one image every two seconds. In yet another embodiment, the camera provides an image in response to a change what the camera observes.

In embodiments of the present disclosure, the camera 10 provides images in RGB format or as grayscale images. The camera 10 may also provide images in a color space that can be converted to RGB. In other embodiments, the camera 10 may provide depth information or multispectral information about the scene being observed.

Machine learning based computer vision requires training data that is representative of all possible input images. This presents a challenge for gauge monitoring in industrial machines as it is difficult or impossible to obtain input images of the gauge at all possible gauge values. Some gauges have a normal operation region and an out-of-normal operation region. Operating the machine so that the gauge is in the out-of-normal operation region to gather training images might be difficult to do, may damage the machine, or may violate procedures/regulations/laws, and/or be dangerous. In other examples, having the gauge go through its entire normal operation region might take a long time, requiring a large amount of resource and/or be costly.

In embodiments of the present disclosure, the gauge monitoring computer vision system generates synthetic training data for substantially all possible gauge values given only one or a few images of gauge values. The gauge monitoring computer vision system of the present disclosure enables digital monitoring of analog gauges that requires minimal per-gauge customization and can be adapted to monitor various types of gauges with minimal effort.

Figure 3:
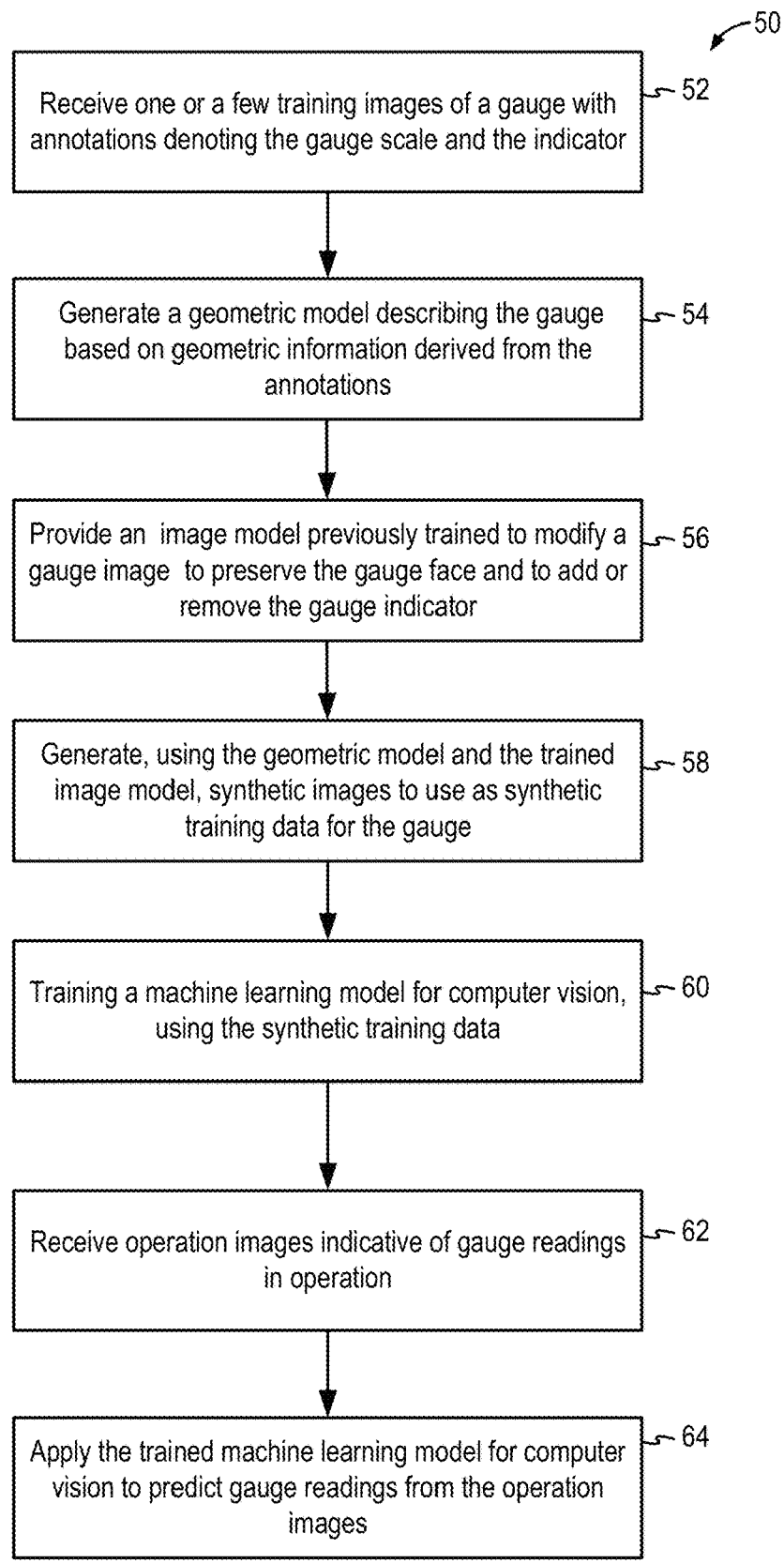
FIG. 3 is a flowchart illustrating a method for gauge monitoring using machine learning based computer vision in embodiments of the present disclosure.

FIG. 3 is a flowchart illustrating a method for gauge monitoring using machine learning based computer vision in embodiments of the present disclosure. The gauge monitoring method can be implemented in the gauge monitoring computer vision system of FIG. 2 in some embodiments. Referring to FIG. 3, a gauge monitoring method 50 receives one or a few training images of a gauge to be monitored (52). The training images include annotations denoting the gauge scale and the indicator on the face of the gauge. In some embodiments, the annotations is provided by a user, such as a field engineer, and requires low human effort. Annotation of the training images will be described in more detail below. In the embodiments of the present disclosure, the method 50 receives a set of one or a few training images for the gauge to be monitored and annotation data associated with each training image. In one example, the set of training images includes five or fewer images. The annotation data denoting the locations of the scale and the indicator on the face of the gauge. In some embodiments, the annotation data may further indicate a threshold value for the gauge.

The method 50 generates a geometric model describing the gauge using geometric information derived from the data relating to the annotations (54). In particular, the geometric model describes the location of the scale on the face of the gauge and the location and movement of the gauge indicator. In one embodiment, the locations of the scale and the indicator are the pixel location, or relative pixel location, of the scale and the indicator in the image of the gauge. The method 50 provides an image model that was previously trained to modify a gauge image to preserve the gauge face while adding or removing the gauge indicator for any given gauge (56). The method 50 uses the geometric model and the trained image model to generate synthetic images of the gauge (58). The synthetic images have the indicator at different positions relative to the scale so that the set of synthetic images forms a training data set for the gauge.

With the synthetic training data thus generated, the method 50 trains a machine learning model for computer vision using the training data set (60). As a result, a trained machine learning model for computer vision is obtained for the subject gauge. The method 50 can then apply the trained machine learning model for computer vision for monitoring the gauge in operation. The method 50 receives operation images of the gauge during operation of the gauge (62). The operation images do not need to be annotated. The method 50 applies the trained machine learning model for computer vision to the operation images to predict readings of the gauge (64).

Figure 4:
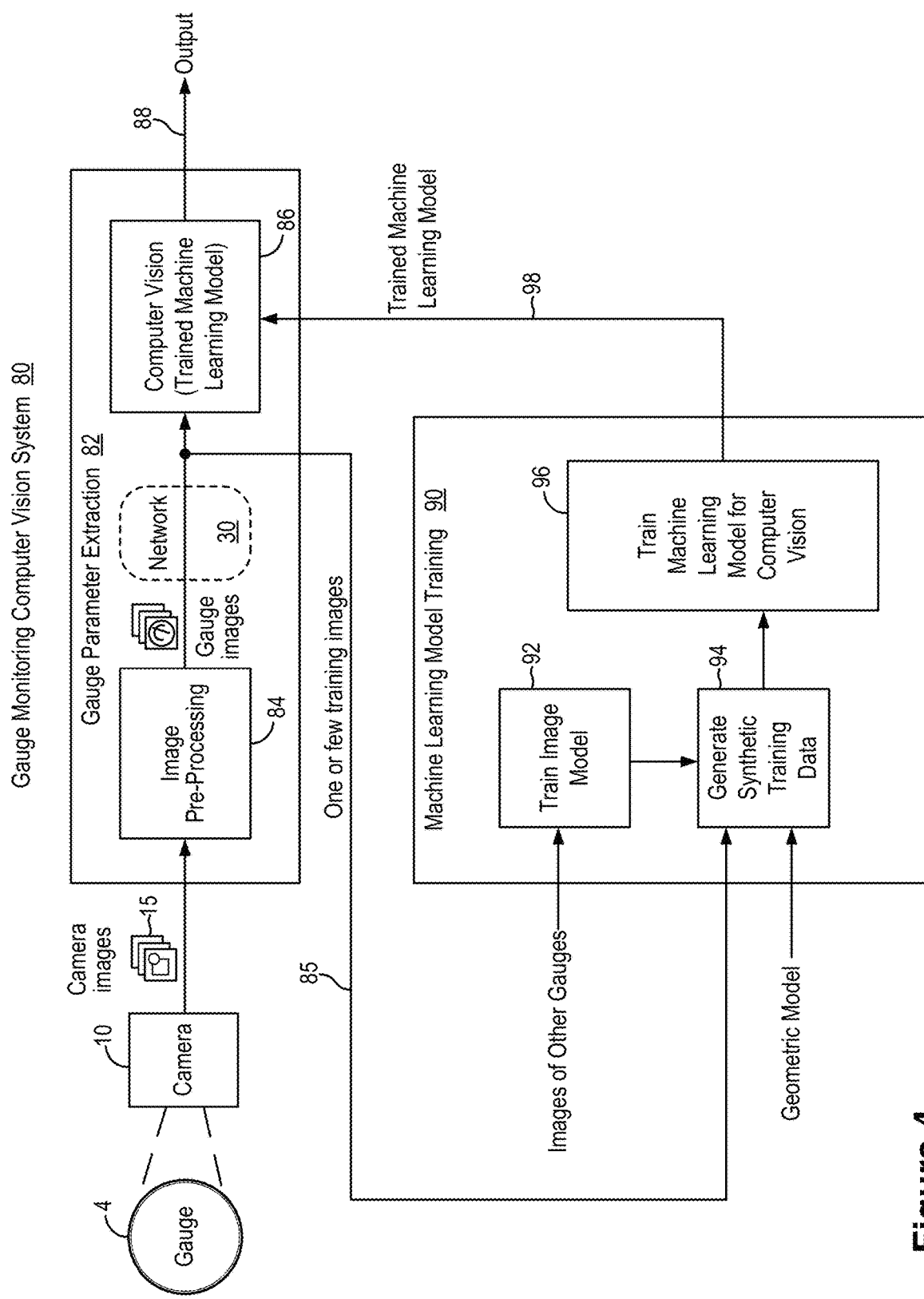
FIG. 4 is a block diagram illustrating a gauge monitoring computer vision system in embodiments of the present disclosure.

FIG. 4 is a block diagram illustrating a gauge monitoring computer vision system in embodiments of the present disclosure. Referring to FIG. 4, a gauge monitoring computer vision system 80 includes a gauge parameter extraction module 82 and a machine learning model training module 90. The system 80 is in communication with a camera 10 for receiving camera images 15 of a gauge 4 to be monitored. In some embodiments, the gauge parameter extraction module 82 includes an image pre-processing module 84 to perform pre-processing of the camera images. In some embodiments, for each captured camera image, a region of interest (ROI) containing the gauge to be monitored is identified and the captured camera image is cropped to the ROI so that the images provided to the computer vision system contains substantially the gauge only and not the surrounding scene in which the gauge is situated. In some embodiments, a user determines the ROI in the camera images and the system 80 crops the camera image to the ROI and scale the cropped image to a given input image size for the computer vision system. The region of interest can be a square or a rectangular region. The image pre-processing module 84 performs cropping and scaling of the camera images to the ROIs as identified by the user(s).

FIG. 5, which includes FIGS. 5(a) and 5(b), illustrates the crop and scale process in some examples. Referring to FIG. 5(a), a camera image 130 is obtained. In this example, the camera image has a size of 1920×1080 pixels. The camera image 130 is annotated with a region of interest 135 around the gauge to be monitored. For example, the region of interest 135 is identified by the pixel location X,Y. The camera image 130 is then cropped to the region of interest 135 to generate a cropped image of the gauge. Referring to FIG. 5(b), a camera image 134 is obtained. In this example, the camera image has a size of 1920×1080 pixels but the image is zoomed in on the gauge. The camera image 134 is annotated with a region of interest 137 around the gauge to be monitored. For example, the region of interest 137 is identified by the pixel location X,Y. The camera image 134 is then cropped to the region of interest 137 to generate a cropped image of the gauge.

The cropped images are scaled so that all image portions provided to the computer vision system are of the same size. In the present example, the cropped image 135 for the camera image 130 may be smaller (e.g. 320 pixels) while the cropped image 137 for the camera image 134 (e.g. 640 pixels) may be larger. The system 80 scales all of the cropped image to the same size, for example, 300×300 pixels. Accordingly, an image portion 132 is created from the cropped image 135 and an image portion 136 is created from the cropped image 137 where both image portions are scaled to the same size. In the case the camera image contains multiple gauges, each gauge is identified with its own region of interest.

In some embodiments, if the camera 10 is observing the gauge 4 at an angle, rectification and/or perspective correction can be applied to the gauge image so that the aspect ratio and/or horizontal and vertical axes of the gauge are preserved In one embodiment, multiple, similar regions of interest for the same gauge are cropped from the same image, recognized independently and the results are used for consistency voting. For example, three regions of interest with same center are selected with one ROI with image scale chosen as previously described, one with 5% greater scale, one with 5% smaller scale. The three gauge images can then be used for consistency voting. The cropped images of the union of the three regions of interest may be sent from the camera to the computer vision system unscaled or scaled to the highest resolution of all the ROIs.

In one embodiment, successive images can be cropped using one of a set of multiple, similar ROI for the same gauge.

As thus processed, only the image portions of the scaled size is processed by the computer vision system 80. In this manner, the system 80 only handles images of limited size, reducing the computational and memory burdens.

Returning to FIG. 4, the processed image portions, referred herein as gauge images, are provided to system 80 for further processing. For instance, when the computer vision module 86 is provided with a trained machine learning model for computer vision, the gauge images are processed by the computer vision module 86 to generate an output, such as a predicted gauge reading value. In embodiments of the present disclosure, the gauge monitoring system 80 may be configured in various combinations to perform the gauge monitoring functions. In the configuration shown in FIG. 4, the gauge monitoring computer vision system is implemented substantially in the cloud. In particular, the computer vision module 86 is deployed in the cloud and receives processed images from the image pre-processing module 84 transmitted over the data network 30. In some embodiments, the image pre-processing module 84 performs image cropping and scaling to the respective ROI. In other embodiments, the image pre-processing module 84 may perform other image processing functions, such as rectification or perspective correction. The image pre-processing module 84 is located at the edge, that is near the camera 10 and the gauge 4. The machine learning model training module 90 is also deployed in the cloud (i.e. on a server or servers in a datacenter) and communicates with the image pre-processing module 84 over the data network 30. The configuration in FIG. 4 is illustrative only and not intended to be limiting. Other configurations of the computer vision system 80 are possible and within the scope of the present disclosure.

Figure 6A:
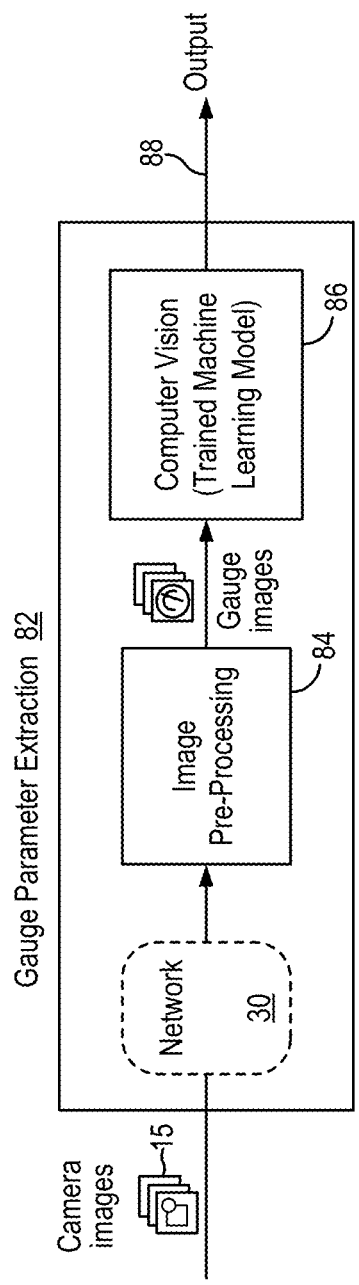
FIGS. 6(a) and 6(b), illustrates alternate configurations of the gauge parameter extraction module in the gauge monitoring computer vision system in some embodiments.
Figure 6B:
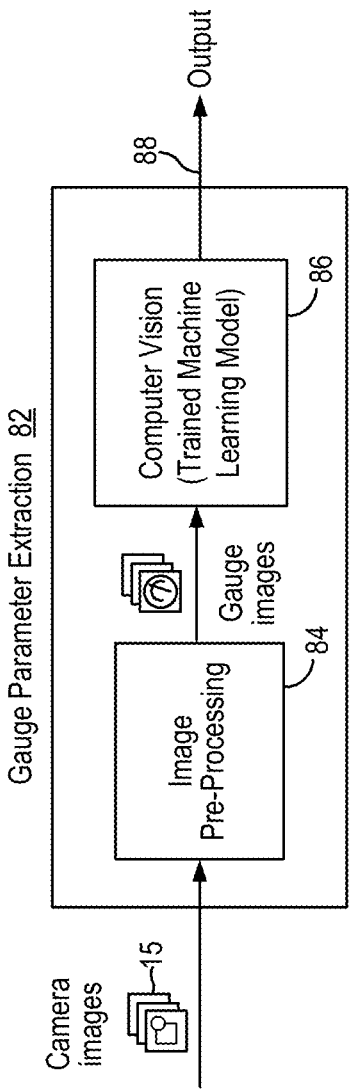

FIG. 6, which includes FIGS. 6(*a*) and 6(*b*), illustrates alternate configurations of the gauge parameter extraction module in the gauge monitoring computer vision system in some embodiments. Referring to FIG. 6(*a*), the gauge monitoring computer vision system 80 may be deployed entirely in the cloud, including the image pre-processing functions. In that case, camera images 15 are transmitted over the data network 30 to the image pre-processing module 84. The cropped and scaled gauge images are then provided to the computer vision module 86 to generate output predictions, or provided to the machine learning model training module 90 (FIG. 4) for training purposes.

Referring to FIG. 6(*b*), the gauge monitoring computer vision system 80 may be deployed entirely at the edge, that is the system 80 may be deployed at the location of the camera and the gauge to be monitored. The image pre-processing 84 and computer vision module 86 are all deployed at the edge or co-located with the camera and the gauge. The computer vision module 86, employing a trained machine learning model, processes the gauge images to generate output, such as the predicted gauge readings. In some embodiments, the output of the computer vision module 86 may be provided to other systems or users over a data network. Furthermore, referring to FIG. 4, in some embodiments, the machine learning model training module 90 may be deployed in the cloud and communicates over a data network with the image pre-processing module 84 to receive training images and communicates with the computer vision module 86 to provide the trained machine learning model. In embodiments of the present disclosure, the data network 30 can be any type of or combination of wired and/or wireless network and/or other computer-to-computer communication network.

Figure 7:
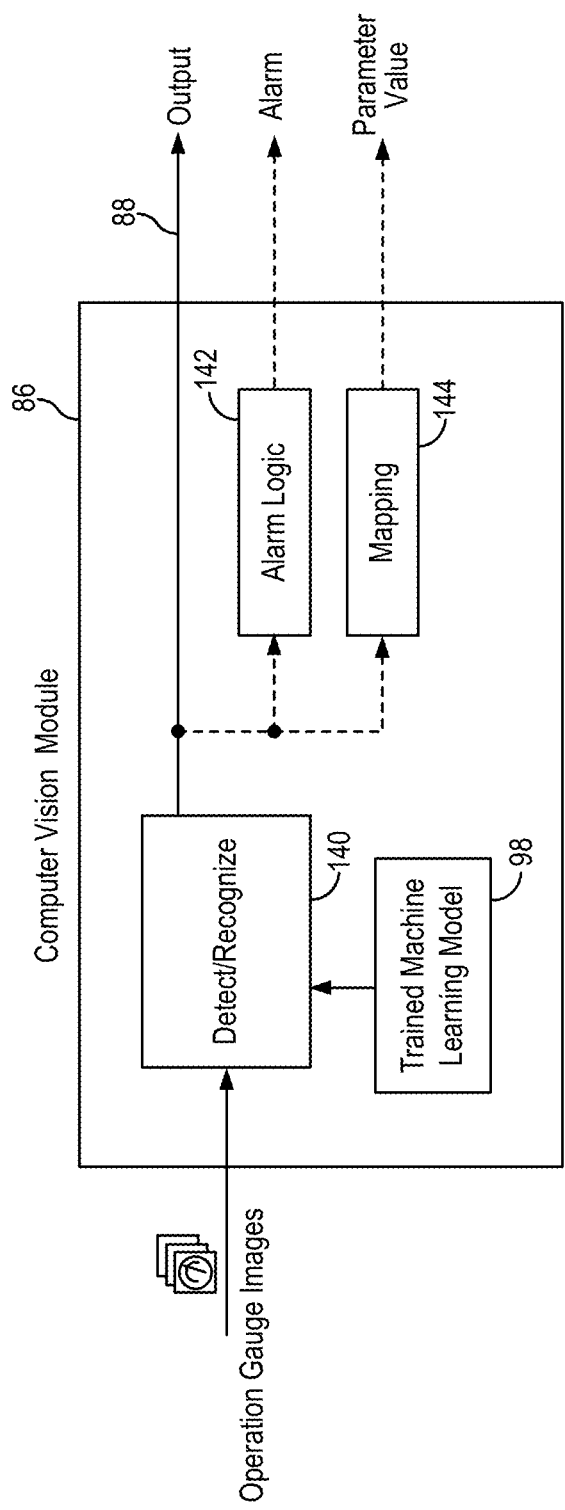
FIG. 7 is a block diagram of the computer vision module in some embodiments.

FIG. 7 is a block diagram of the computer vision module in some embodiments. Referring to FIG. 7, the computer vision module includes a detect/recognize module 140 using the trained machine learning model 98 to detect and recognize the operation gauge images. In the present description, operation gauge images or operation images refer to gauge images obtained from the gauge while in operation, as opposed to images being obtained for training data. The operation images do not contain annotations and do not need to be annotated.

The detect/recognize module 140 generates an output (88) indicative of a predicted gauge reading for each operation image. In one example, the output is a normalized value indicating the gauge reading value over a normalized range, such as 0 to 1. The structure of the detect/recognize module 140 in the computer vision module will be described in more details below.

In some embodiments, the detect/recognize module 140 is trained to classify the predicted gauge reading as being above or below a given threshold. In that case, the computer vision module 86 may include an alarm logic 142 to generate a notification for certain desired conditions, such as when the predicted gauge reading is above or below the threshold. In other embodiments, the computer vision module 86 includes a mapping module 144 to map the output value to the real-world parameter value being measured by the gauge. In this manner, binarization of the analog gauge is realized where digital output values of the analog gauge can be provided. The alarm logic and the mapping module are optional and one or both may be omitted in alternate embodiments of the present disclosure.

In some embodiment, the alarm logic 142 is trained to send notification for the following conditions:

(1) The gauge reading value changes to above or below a threshold. The alarm logic may apply hysteresis to avoid sending multiple alarms when the gauge reading value drifts around the threshold. Multiple thresholds maybe be used to implement the hysteresis.

(2) Gauge is not readable or not visible for a specified amount of time. For example, the gauge has not been visible for 5 minutes.

(3) No image has been received from the camera in a specified amount of time. For example, no image has been received for 5 minutes.

In some embodiments, the notification can be in the form of emails, SMS, push notification to cellphone or other mobile device, Amazon AWS Simple Notification Service (SNS).

In some embodiments, the mapping module 144 can be configured to convert the normalized and dimensionless output value (0.0 . . . 1.0) generated by the computer vision module to real-world values (e.g. PSI/volts/RPM/volume). In one embodiment, a mapping of a simple linear gauge could be represented linearly by interpolating between the real-world values corresponding to output value 0.0 and 1.0 and providing the real-world value outputs with the character string describing the unit of measurement. In another embodiment, a mapping of any gauge (linear, logarithmic, arbitrarily non-linear, etc.) could be represented piecewise linearly by interpolating between the real-world values corresponding to many (e.g. 10) values and providing the real-world value outputs with the character string describing the unit of measurement.

In one example, a pressure (PSI) gauge is not accurate between 0 and 10 PSI and is linear between 10 PSI and 160 PSI. The mapping module may represent this gauge piecewise linearly using three values, the values for 0 PSI, 10 PSI and 160 PSI.

Returning to FIG. 4, the gauge monitoring computer vision system 80 uses a machine learning model for performing computer vision at module 86. The machine learning model is trained to recognize and detect the gauge to be monitored (gauge 4). To that end, for each gauge to be monitored, the system 80 trains the machine learning model to recognize and detect the gauge. In embodiments of the present disclosure, the system 80 includes the machine learning model training module 90 for training a machine learning model for the gauge 4. The training module 90 uses a set of training images with annotations to train the machine learning model. As described above, machine learning for gauge monitoring requires input images of all possible gauge indicator locations which are difficult or impossible to obtain for analog gauges. In embodiments of the present disclosure, the training module 90 uses one or a few training images only to train the machine learning model for computer vision. Ease and cost saving in deployment of the computer vision system is achieved.

To that end, for the purpose of machine learning model training, one or a few camera images are obtained and the camera images are cropped and scaled as described above and are further annotated to denote the scale and the indicator on the gauge face. One or a few annotated gauge images form the set of the training images. The set of training images are provided to the training module 90. The training module 90 generates a set of synthetic images (94) as the training data set. The synthetic images are generated using an image model (92) previously trained using images of other gauges, the set of training images of the gauge to be monitored, and a geometric model of the gauge derived from the annotation data from with the training images. The set of synthetic images form the training data set used to train a machine learning model for computer vision (96). In this manner, a trained machine learning model (98) is obtained from only one or a few actual gauge images. The trained machine learning model (98) is then provided to the computer vision module 86 to performing detection and recognition on the gauge images provided by the camera with the gauge in normal operation. Note that for the purpose of computer vision detection, the gauge images do not need to be annotated. Annotation is only performed for preparing the training images.

In embodiments of the present disclosure, the machine learning model based computer vision is trained using the training data set of synthetic images. The computer vision training is performed in accordance with the specific computer vision model used. Training data consists of the synthetic images and ground truth information (e.g. corresponding indicator location, indicator value and/or above/below threshold(s)). In some cases, the training software may use separate files for images (e.g. JPEG) and ground truth information (e.g. JSON). In other cases, the training software may use files with both images and ground truth information (e.g. TensorFlow TFRecords). In some examples, common optimization techniques can be used for training, including RMSprop, Adadelta and Adam.

The gauge monitoring computer system 80 of the present disclosure realizes many advantages over conventional techniques. First, the detect/recognize module in the computer vision module and the image model using in the training module operates on minimally processed image data. For example, a region of interest is identified in the camera images and image portions are cropped and scaled from RGB (or grayscale or other) camera image. No binarization of images or conversion of RGB or grayscale images to binary images is needed. No edge detection, no connected component analysis, no line finding or Hough transform, no fiducial or template images, and no conversion to polar images or intensity profiles are performed or used.

The system 80 uses machine learning to generate the synthetic gauge images for training instead of relying on handcrafting. Thus, no manual separation of the gauge face and gauge indicator is required. Furthermore, the computer vision module does not use any mask.

In addition, the system 80 makes no assumption that the indicator can be modeled by a line, the longest line or with a template. For actual gauge, the indicator might cast one or more shadows and/or have one or more reflections. The system 80 realizes flexibility to allow the indicator to be of any shape.

Figure 8:
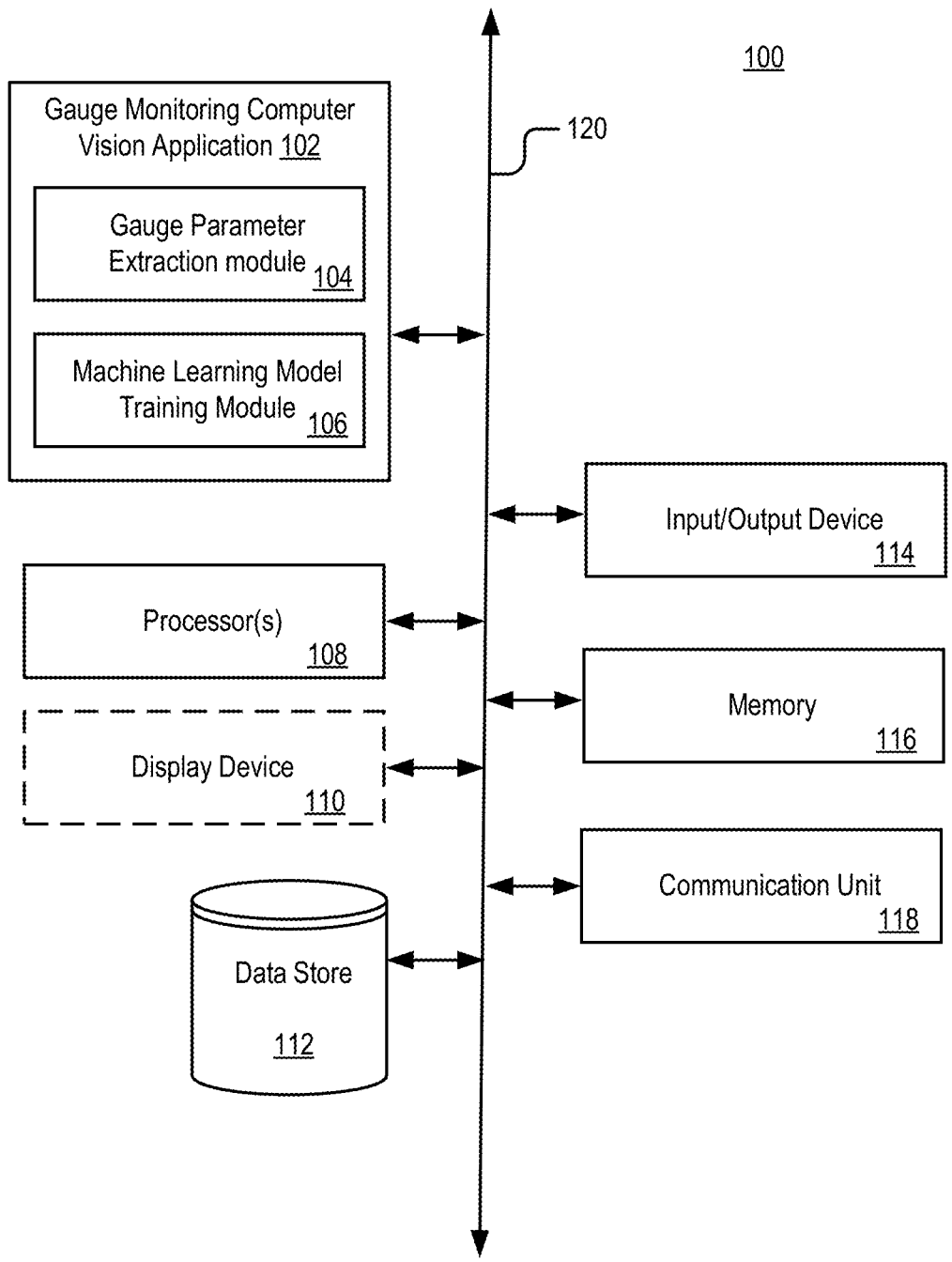
FIG. 8 is a block diagram of an example computing system which may represent the computer architecture of a computing device, computing entity, or server for implementing the gauge monitoring computer vision system in embodiments of the present disclosure.
Figure 9A:
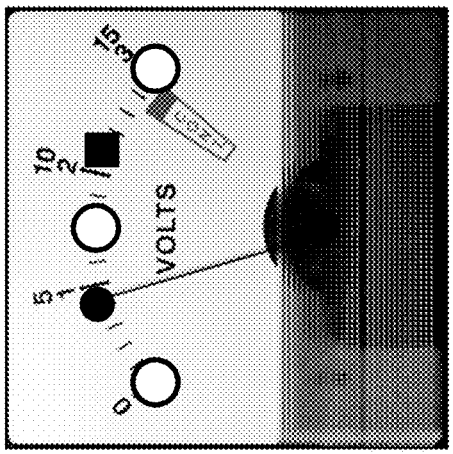
FIGS. 9(a) to 9(d), illustrates the annotation of a gauge image and the creation of a geometric model for the gauge in some embodiments.
Figure 9B:
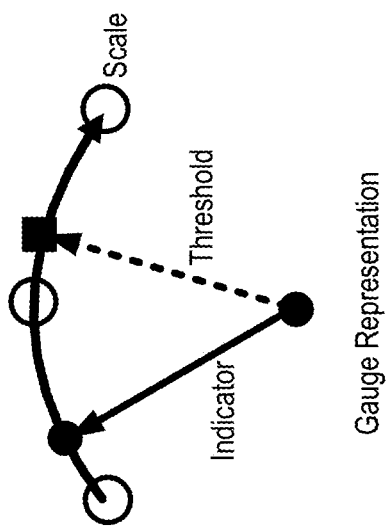
Figure 9C:
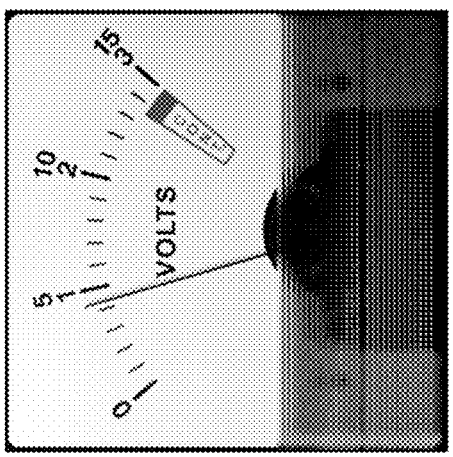
Figure 9D:
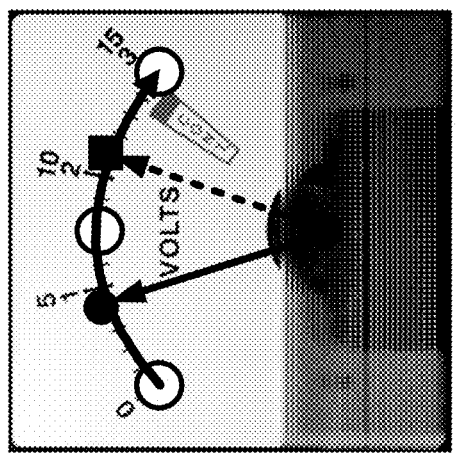

FIG. 8 is a block diagram of an example computing system which may represent the computer architecture of a computing device, computing entity, or server for implementing the gauge monitoring computer vision system in embodiments of the present disclosure. Referring to FIG. 8, in some embodiments, the computing device 100 is implemented as a system which may also include one or more processors 108, a memory 116, an optional display device 110, a communication unit 118, a data storage 112, and an input/output device 114 according to some examples. The components of the system 100 are communicatively coupled to a bus 120 for communication with each other. The computing device further includes a gauge monitoring computer vision application 102 for providing machine learning based gauge monitoring functions.

The processor 108 may execute software instructions by performing various input/output, logical, and/or mathematical operations. The processor 108 may have various computing architectures to process data signals. The processor 108 may be physical and/or virtual and may include a single processing unit or a plurality of processing units and/or cores. In some implementations, the processor 108 may be capable of generating and providing electronic display signals to a display device and other functions. In some implementations, the processor 108 may be coupled to the memory 116 via the bus 120 to access data and instructions therefrom and store data therein. The bus 120 may couple the processor 108 to the other components of the system including, for example, the memory 116, the communication unit 118, the computer vision application 102, and the data storage 243. It will be apparent to one skilled in the art that other processors, operating systems, and physical configurations are possible.

The memory 116 may store and provide access to data for the other components of the system. In some implementations, the memory 116 may store instructions and/or data that may be executed by the processor 108. The instructions and/or data may include code for performing the techniques described herein. For example, in one embodiment, the memory 116 may store the computer vision application 102. The memory 116 is also capable of storing other instructions and data, including, for example, an operating system, hardware drivers, other software applications, databases, etc. The memory 116 may be coupled to the bus 120 for communication with the processor 108 and the other components of the system.

The memory 116 may include one or more non-transitory computer-usable (e.g., readable, writeable) device, a dynamic random access memory (DRAM) device, a static random access memory (SRAM) device, an embedded memory device, a discrete memory device (e.g., a PROM, FPROM, ROM), a hard disk drive, an optical disk drive (CD, DVD, Blu-ray, etc.) mediums, which can be any tangible apparatus or device that can contain, store, communicate, or transport instructions, data, computer programs, software, code, routines, etc., for processing by or in connection with the processor 108. In some implementations, the memory 116 may include one or more of volatile memory and non-volatile memory. It should be understood that the memory 116 may be a single device or may include multiple types of devices and configurations.

The display device 110 may be a liquid crystal display (LCD), light emitting diode (LED) or any other similarly equipped display device, screen or monitor. The display device 110 represents any device equipped to display user interfaces, electronic images and data as described herein. In different embodiments, the display is binary (only two different values for pixels), monochrome (multiple shades of one color), or allows multiple colors and shades. The display device 110 is coupled to the bus 120 for communication with the processor 108 and the other components of the system. It should be noted that the display device 110 is shown in FIG. 8 with dashed lines to indicate it is optional. For example, the system may be a server for performing computer vision for gauge monitoring without a display device 110.

The communication unit 118 is hardware for receiving and transmitting data by linking the processor 108 to a data network and other processing systems. In one embodiment, the communication unit 118 may include a port for direct physical connection to a data network. In another embodiment, the communication unit 118 may include a wireless transceiver (not shown) for exchanging data via a wireless network using one or more wireless communication methods, such as IEEE 802.11, IEEE 802.16, Bluetooth®, cellular communications, or another suitable wireless communication method.

The data storage 112 (or data store 112) is a non-transitory memory that stores data for providing the functionality described herein. In the illustrated embodiment, the data storage 112 is communicatively coupled to the bus 120 to receive data for storage and provide data for retrieval upon a request for the data. The data storage 112 may store gauge images, camera images and trained machine learning models for gauges being monitored.

In some embodiments, the computer vision application 102 includes a gauge parameter extraction module 104 and a machine learning model training module 106. The components of the computer vision application 102 may include software and/or logic to provide the functionality they perform. In some embodiments, the components can be implemented using programmable or specialized hardware including a field-programmable gate array (FPGA) or an application-specific integrated circuit (ASIC). In some embodiments, the components can be implemented using a combination of hardware and software executable by processor 108. In some embodiments, the components are instructions executable by the processor 108. In some implementations, the components are stored in the memory 116 and are accessible and executable by the processor 108.

Gauge Image Annotation and Geometric Model Generation

The process to annotate the training gauge images and to generate the geometric model of the gauge will now be described with reference to FIG. 9. FIG. 9, which includes FIGS. 9(*a*) to 9(*d*), illustrates the annotation of a gauge image and the creation of a geometric model for the gauge in some embodiments. Referring to FIG. 9(*a*), a cropped and scaled gauge image of a gauge to be monitored is obtained to use as a training image. The training image is annotated, such as by a user or a field engineer, to indicate the locations of the scale and the indicator in the gauge image. The annotation of the training image requires low human effort and the annotation requires only marking a few points on the training image. Referring to FIG. 9(*b*), the training image is marked to indicate the endpoints of the scale (open circles). In the case the scale is an arc, the training image is further marked to indicate a point on the scale between the endpoints. The third point marked on the scale can be at any location between the two endpoints. In some embodiments, the third point should not be coincident with an endpoint and is preferably in the middle third of the scale. In one embodiment, the angle corresponding to the minimum endpoint is in the range 0 (inclusive) to 360 (exclusive) degrees, and the angle corresponding to the maximum endpoint is in the range −360 (exclusive) to 720 (exclusive) degrees to avoid ambiguities for any indicator arc that crossed 0 degrees. For a linear scale, only the endpoints of the scale need to be marked. The training image is then marked to indicate the endpoints or the head and tail of the indicator (closed circles). The annotations of the training image is complete. Only 4-5 points are required to be marked to denote the scale and the indicator. In some embodiments, a threshold level on the scale may be marked (square box). The threshold level marking allows the machine learning system to learn the threshold gauge value which can be used to generate an output being a condition of the gauge being above or below the threshold value. Alternately, the threshold level marking can be provided to the alarm logic 142 (FIG. 7) to generate an alarm based on the threshold and the output of the detect/recognize module 140.

With the training image and the annotation data thus generated, the training module generates a geometric model for the gauge, as shown in FIG. 9(*c*). The geometric model describes the gauge in the training image. For example, the geometric model uses the markings for the scale to model an arc for the scale and uses the markings for the indicator to model the shape and location of the indicator needle. In the present example, given 3 points on a circle, the center and the radius of the circle can be computed and the arc of the scale and the motion of the indicator can be derived. FIG. 9(*c*) illustrates the geometric model overlaying the training image for illustrative purposes. In operation, the gauge representation shown in FIG. 9(*d*) illustrates the geometric model of the gauge created from the annotation data. The geometric model further models the movements of the indicator. The indicator motion can be modeled as a line segment (for linear motion) or segment (arc) of a circle (for circular motion). In particular, for linear indicator motion, the geometric model may use linear interpolation between endpoints to estimate the gauge reading. For circular indicator motion, the geometric model may convert pixel locations to angles based on the center point of the scale's circle and uses interpolation between angles to estimate the gauge reading.

The geometric model describes the gauge to be monitored so that, given an indicator value between the minimum range value (e.g. 0.0) and the maximum range value (e.g. 1.0), the corresponding pixel location of the head of the indicator on the scale can be determined and the corresponding tail of the indicator location can be determined. Alternately, given a pixel location of the head of the indicator on the scale, the corresponding range value (e.g. between 0.0 and 1.0) can be determined.

In one example, a linear gauge has a minimum indicator range position at pixel x=100, y=100 and a maximum indicator range position at pixel x=100, y=200. An indicator value of 0.25 corresponds to the indicator pixel location x=100, y=125. An indicator pixel location x=100, y=175 corresponds to an indicator value of 0.75.

In the above description, the annotations for a circular or arc scale are made by marking the end points and a third point along the scale. In other embodiments, other methods to mark the scale can be used. In one embodiment, a line, circle or ellipse can be computed from pairs of markings of the indicator head and tail. That is, the annotations can include three pairs of indicator head and tail markings where the tail markings may be at the same location. A total of 6 markings are annotated to use to derive the geometric model.

It is instructive to note that as long as the gauge images are annotated correctly in the images, it does not matter if there is Parallax between the indicator and the face or that the camera is at an oblique angle. The geometric model can still be correctly derived to describe the locations of the scale and the indicator and the motion of the indicator.

Generating Synthetic Training Data

The gauge monitoring computer vision system of the present disclosure generates a set of synthetic images from the one or few gauge images to use as the training data set for the machine learning model. The generation of the synthetic gauge images will now be described. As described in reference to FIG. 4, the machine learning model training module generates a set of synthetic images as training data set for training the machine learning model for computer vision. The synthetic images are generated using an image model previously trained using images of other gauges, the one or few training images of the gauge to be monitored, and a geometric model of the gauge derived from the annotation data associated with the training images. In operation, the image model receives an input image and generates an output image. The image model has been previously trained using images of other gauges to enable the image model to modify the input images such that the gauge indictor is modified (drawn or erased) while the gauge face or background is preserved. The structure of the image model will be described in more detail below.

Figure 10:
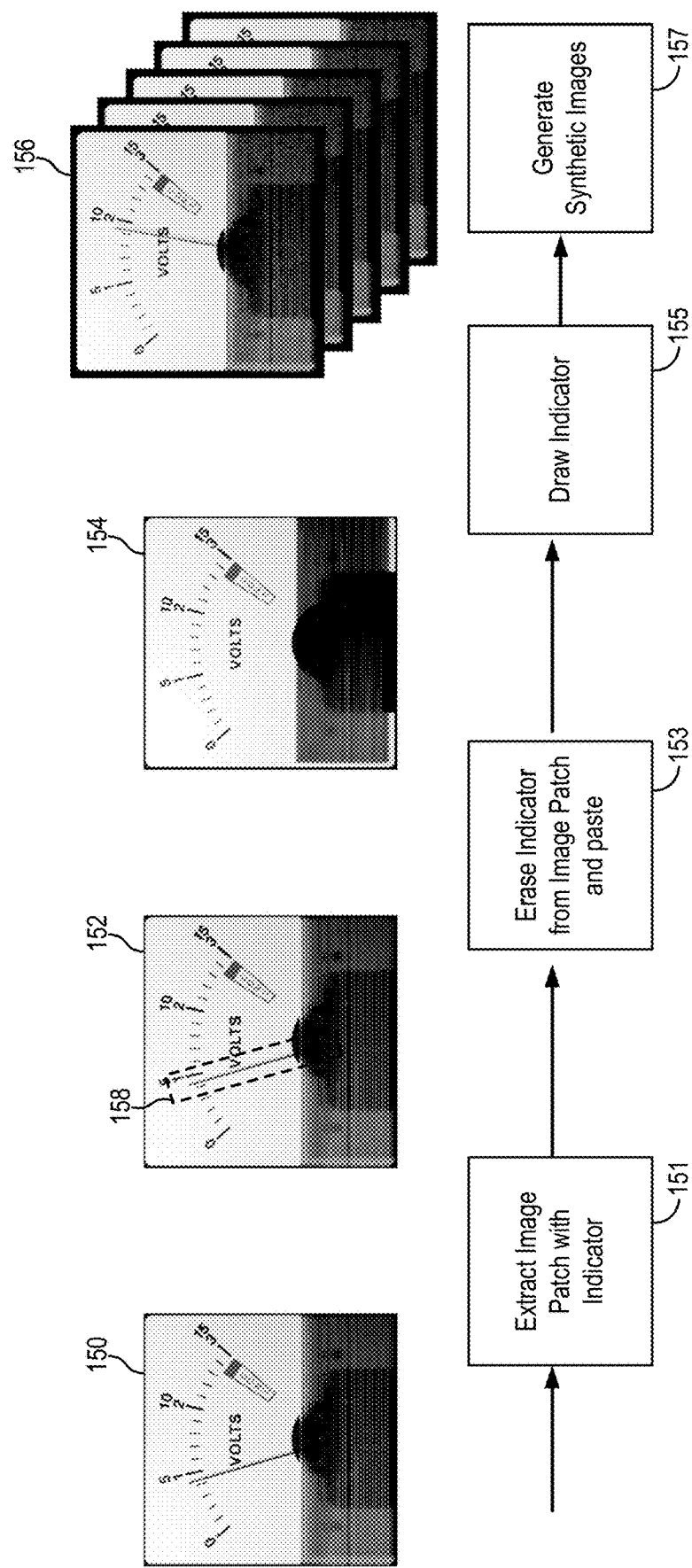
FIG. 10 illustrates the process for generating a set of synthetic images with the gauge indicator in arbitrary locations in some embodiments.

FIG. 10 illustrates the process for generating a set of synthetic images with the gauge indicator in arbitrary locations in some embodiments. Referring to FIG. 10, a method to generate a set of synthetic images to use as training data uses a training image of the gauge to be monitored. The training image is a gauge image that has been cropped and scaled. The training image has also been annotated so that a geometric model describing the gauge has been created.

The method receives an input training image 150 and attempts to erase the indicator from the training image to generate a base image 154 of the gauge being the gauge image without the indicator. To generate the base image 154, the method extracts an image patch 158 from the input training image 150 surrounding the indicator (151). Image 152 illustrates the image patch 158 in dotted box to be extracted from the input training image 150. The method locates the image patch 158 with the indicator by using the geometric model and annotation information about the training image indicating where in the image the indicator is located. The method then provides the image patch 158 to the previously trained image model to erase the indicator from the image patch. The trained image model provides as output an image patch with all the gauge background but without the indicator. The method pastes the modified image patch back to the original image at the same location where the image patch was extracted. As a result, the method generates the base image 154 without the indicator (153). In particular, the image model has been trained to identify and separate the gauge background from the indicator. No human intervention, other than providing the annotation markings, is needed to separate the indicator from the face of the gauge.

With the base image 154 thus generated and again using the trained image model, the method then draws the indicator (step 155) onto the base image at arbitrary locations to generate synthetic images 156. In particular, the method selects an image patch from the base image using the geometric model. The method then provides the selected image patch to the previously trained image model as input. The trained image model draws the indicator onto the image patch (step 155). The trained image model provides as output an image patch with all the gauge background and with the indicator. The modified image patch with the indicator is then pasted back to the original image at the same location where the image patch was extracted. As a result, the method generates a synthetic image 156 with the indicator (step 157). By using the base image and repeatedly drawing the indicator in many different, arbitrary locations onto the base image, the method generates a set of synthetic images 156 having the indicator at different, arbitrary locations. The set of synthetic images can then be used as training data set to train the machine learning model for computer vision.

Figure 11:
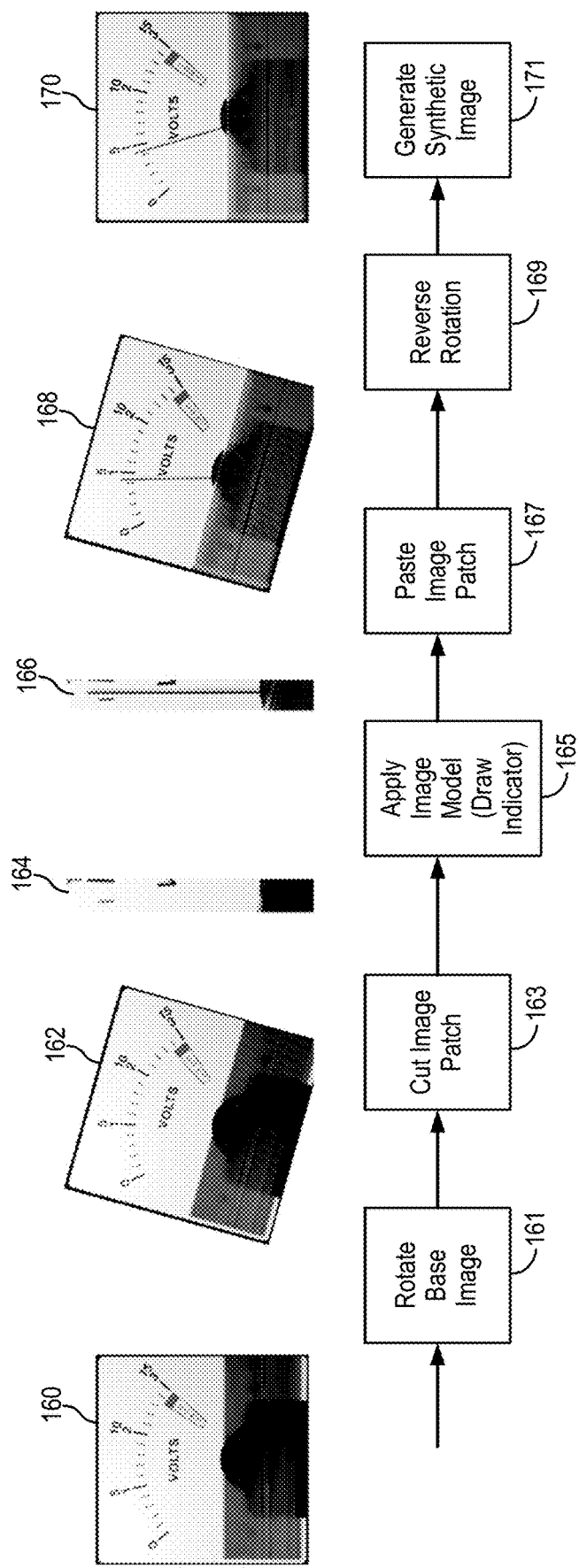
FIG. 11 illustrates the process for drawing the indicator onto a base image to generate a set of synthetic images with the gauge indicator in arbitrary locations in some embodiments.

FIG. 11 illustrates the process for drawing the indicator onto a base image to generate a set of synthetic images with the gauge indicator in arbitrary locations in some embodiments. As described above, the image model is applied to enable the indicator to be erased or draw onto the base image or onto a patch of the base image while preserving any marking on the face near the indicator. In this manner, a set of synthetic images can be generated with different indicator positions. In some embodiments, the trained image model also receives as input a reference image patch containing an indicator. For example, the reference image patch may contain an example of the indicator to draw onto the base image.

Referring to FIG. 11, the base image 160 without the indicator has been created. In the present example, the indicator moves in a circular arc, as described by the geometric model. Therefore, the method to draw an indicator onto the base image at an arbitrary location begins by rotating the base image (161) to obtain a rotated base image 162. Rotating the base image enables the subsequent draw and paste operations to be carried out in a vertical direction, making it easier to perform the draw and paste operations. Alternately, in other embodiments, the method can rotate the base image so that the subsequent draw and paste operations are carried out in a horizontal direction. The amount of rotation to apply corresponds to the arbitrary location where the indicator is to be drawn. The rotation can be every degree, every one-third of a degree, every 0.1 degree, etc. In other embodiments, when the indicator movement, as described by the geometric model, is linear, no rotation of the base image is needed.

With the rotated base image 162, an image patch 164 is cut or extracted from the rotated image (163) using information from the geometric model. Using the trained image model and optionally with the reference image patch, the image model draws an indicator onto the extracted image patch (165). As a result, a modified image patch 166 with the indicator drawn thereon is generated. The modified image patch 166 preserves all of the marking that was previously there before the draw operation. That is, the modified image patch 166 has markings on the face as in the image patch 164. The method then pastes the modified image patch 166 back onto the base image at the same location where the image patch was extracted (167). As a result, a rotated image with indicator 168 is obtained. The method then reverses the rotation previously applied (169) and a synthetic image 170 with the indicator at an arbitrary location is generated. The image model further generates symbolic data for each indicator location (step 171). The symbolic data is therefore associated with each synthetic image 170. In some embodiments, the symbolic data includes one or more of the following: the value corresponding to the indicator being drawn, the pixel location of the head of the indicator, the pixel location of the tail of the indicator, the pixel locations of the scale, and if the indicator is above or below a threshold or thresholds.

The method in FIG. 11 is repeated multiple times to generate a set of synthetic images 170 with indicator and symbolic data at various locations on the fact of the gauge. As described above, in the case the indicator movement is linear, no rotation or un-rotation is necessary.

Image Model

As described above, the gauge monitoring computer vision system of the present disclosures uses an image model previously trained to separate the gauge indicator and gauge background and to modify an image of the gauge, or an image patch of the gauge, to erase or draw the indicator, while preserving the markings on the face of the gauge in the image or image patch. The image model will now be described in more details.

In some embodiments, if the camera images are RGB, the image model input image and output image are also RGB. Alternately, if the camera images are grayscale, the image model input image and output image are grayscale. Images from other cameras, such as depth or multispectral cameras may also be used.

In embodiments of the present disclosure, the image model is implemented as a generative adversarial network (GAN) type neural network for image-to-image translation that has been specifically trained for recognizing gauge indicators and faces. For example, the GAN is trained using loss functions for the gauge face and gauge indicator. A GAN type neural network has the advantage that different inputs result in different outputs so the synthetic training images thus generated can be more suited to use for training a machine learning model, as compared to images from simple copy/paste or computer graphics approaches to generate synthetic training images. Furthermore, a GAN can learn gauge appearance such as shadows and reflections in mirror strips on the face to improve output accuracy. In other embodiments, other image-to-image translation technique may be used.

In the present description, a generative adversarial network (GAN) refers to generative modeling using deep learning methods, such as convolutional neural networks (CNN). A generative adversarial network (GAN) is constructed using a deep neural net architecture comprised of two networks, pitting one against the other (thus the "adversarial"). One neural network, called the generator, generates new data instances, while the other, the discriminator, evaluates the new data for authenticity. That is, the discriminator decides whether each instance of data that it reviews belongs to the actual training dataset or not. The generator may be a convolutional neural network or a deconvolutional neural network, and the discriminator is a convolutional neural network.

Figure 12:
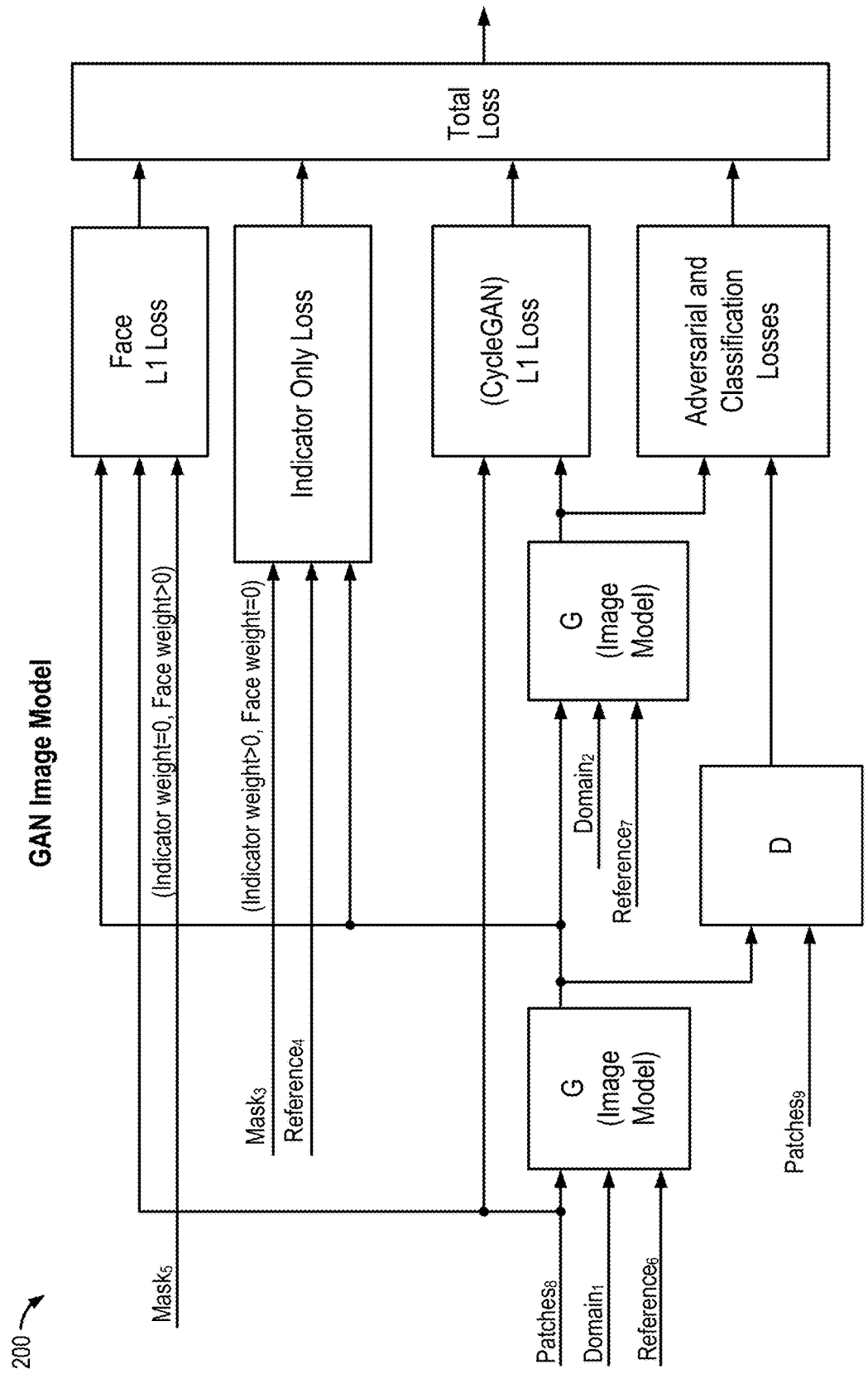
FIG. 12 is a block diagram of an image model implemented as a generative adversarial network (GAN) image to image translator in some embodiments of the present disclosure.

FIG. 12 is a block diagram of an image model implemented as a generative adversarial network (GAN) image to image translator in some embodiments of the present disclosure. Referring to FIG. 12, an image model 200 is implemented as a GAN including a GAN generator (G) and a discriminator (D). The GAN is trained to perform image-to-image mapping differently on gauge faces versus gauge indicators. In FIG. 12, the generator G is used twice during training and therefore two instances of the generator G are shown in FIG. 12. In operation, only one generator G is used. The generator G is the image model being applied to erase and draw indicators for generating the synthetic training images, as described above.

The GAN image model 200 is trained to perform two operations:

(1) Erase operation that removes the Indicator: that is, the GAN generator (G) will take an image or an image patch with the indicator as input and output a corresponding image or image patch without the indicator; and (2) Draw operation that creates the Indicator: that is, the GAN generator (G) will take an image or image patch without the indicator as input and output a corresponding image or image patch with the indicator.

In embodiments of the present disclosure, the GAN may operate on small patches of the gauge image. For example, the image patch may have a size of 8×128, 12×192, 16×256 or 24×96 pixels. Patches$_8$ as input to the generate G are randomly chosen input image patches.

In the present embodiment, the image model follows the StarGAN image-to-image translation GAN approach. StarGAN, also known as Unified Generative Adversarial Networks for Multi-Domain Image-to-Image Translation, refers to the technique where a single (unified) model is trained on multiple image datasets and their feature attributes (domain) are transferred among themselves. StarGAN uses a mask vector which is similar to the subnet masks in network theory.

Using the StarGAN approach, the generator G has a Domain input that specifies the desired output of the generator G. Domain$_1$ is "erase" or "draw", randomly chosen. Domain$_2$ is "erase" or "draw", matching the corresponding Patches$_8$. In traditional StarGAN, Patches and Domain are combined as the CNN input to the generator G. In the present implementation, Patches, Reference and Domain are combined as the CNN input to the generator G.

In the present embodiment, Reference$_6$ is an image patch with an indicator when Domain$_1$ is "draw" and all zeros otherwise. Reference$_7$ is an image patch with an indicator when Domain$_2$ is "draw" and all zeros otherwise. Alternatively, Reference$_6$/Reference$_7$ is an image patch with an indicator (i.e. for "erase" and "draw"). Alternatively, Reference$_6$/Reference$_7$ is an image patch with an indicator when Domain$_1$/Domain$_2$ is "draw" and an image patch without an indicator otherwise. The output of the generator G is an image patch. The goal of the training is to train the generator G which is used as the image model for generate synthetic images as training data.

In some embodiments, Patches$_8$, Patches$_9$, Reference$_4$ and Reference$_6$ are augmented by a random color distortion, where one or more of the brightness, contrast or hue of the image patches are randomly changed. Other augmentations used for training for object detection may also be used.

FIG. 13 illustrates the pseudocode fragment illustrating an implementation for the generator G in some examples. The "3" parameter in the pseudocode causes the output to be 3 components to support RGB images. In the example shown, the input is (a batch of) two patches and the output is only (a batch of) one patch.

In some embodiments, the image model can implement the CycleGAN approach, also referred to as Unpaired Image-to-Image Translation using Cycle-Consistent Adversarial Networks. In the CycleGAN implementation, there are two generators G, one for erase and one for Draw. If the input patch has the Indicator, the generator G Erase and then the generator G Draw are used. If the input patch does not have the Indicator, the generator G Draw and then the generator G Erase are used.

Returning to FIG. 12, the discriminator D is implemented as a discriminator CNN. In some embodiments, the discriminator D is implemented following the structure in StarGAN. Patches$_9$ are randomly chosen input patches from Domain$_1$. Discriminator D is a classifier that classifies inputs as real patches (inputs Patches$_9$) or fake patches (created by generator G). Adversarial and Classification Losses are preferably the same as in StarGAN. In a GAN, the joint training of generator G and discriminator D causes generator G to create outputs that are similar to real patches and cause discriminator D to classify its inputs as real or fake.

In the present embodiment, the L1 loss is implemented as in CycleGAN. The CycleGAN L1 loss is the sum of the absolute value of the pixel value differences between the input patch and the result after the second use of the generator G transforms the patch to the same domain (with indicator, without indicator) as the input. For example, if an indicator is drawn, CycleGAN remove what was drawn to get the original input. Minimizing this loss trains the GAN to make outputs that are similar to inputs.

The Face L1 Loss is the sum of the absolute value of the pixel value differences between the input patch and the result after the first use of generator g only for the pixels of the face of the gauge. A binary mask ($Mask_5$) is used to identify the face pixels. Pixels not identified as face by the $Mask_5$ are not summed in this loss.

Preferably, $Mask_5$ is $Mask_3$ dilated (e.g. by 3 pixels). If $Mask_3$ perfectly distinguished between the gauge face and the indicator pixels, this dilation would result in only face pixels more than three pixels away from the Indicator being included in this loss. In some cases, certain pixels may be a combination of the face and the indicator or there may be small human errors in the creation of $Mask_3$. In these cases, the dilation, makes it more likely that only face pixels contribute to the loss, even if some face pixels near the indicator do not contribute to the loss.

Figures 14A, 14B, 14C:
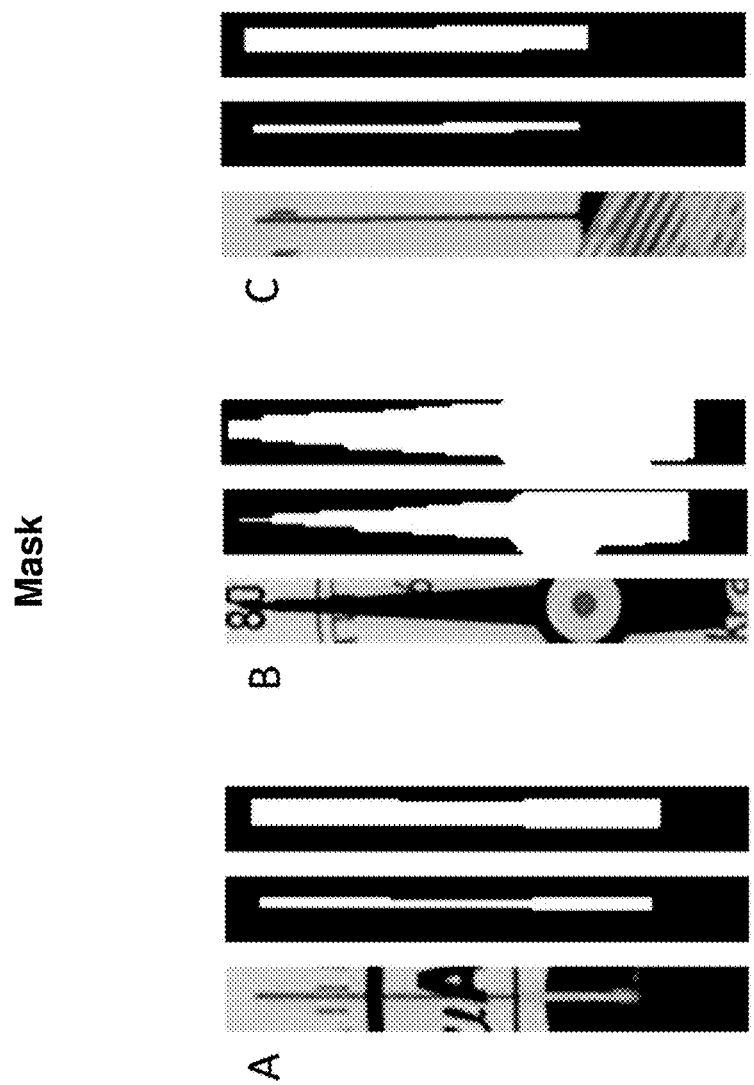
FIGS. 14(a) to (c), illustrates examples of image patches with masks which can be to train the image model in some embodiments.

FIG. 14, which includes FIGS. 14(a) to (c), illustrates examples of image patches with masks which can be to train the image model in some embodiments. It is instructive to note that the masks are only used for creating and training the image model. The masks are not used when the image model is applied to generate the training data set.

Referring to FIG. 14, three examples A, B and C of $Patches_8$ (left), corresponding pixel accurate $Masks_3$ (center) and corresponding dilated $Masks_5$ (right) are shown. Coordinates calculated from the Geometric Model are used to align and scale the masks to match the patch. In the examples shown in FIG. 14, the masks are the correct shape to match the corresponding indicators, but in the case of examples A and B have not yet been scaled and aligned.

Returning to FIG. 12, for Draw domain, the Indicator Only Loss is a function of differences between the input patch and a reference patch with the desired Indicator ($Reference_4$). A binary mask ($Mask_3$) is used to identify indicator pixels in the reference patch and only those pixels contribute to the loss. In some cases, a pixel might be a combination of both the gauge face and the indicator, and $Mask_3$ is a human's best effort to choose between the face or indicator.

In some embodiments, the training data used to train the GAN is Computer Graphics Imagery (CGI) generated and for a specific training image, a corresponding image is available without the indicator or with the indicator in a different position and the mask is created by identifying pixel locations where the absolute difference between the two corresponding images is above a threshold (e.g. 10% of the maximum pixel value). Alternatively, (e.g. for CGI images with some noise from lossy JPEG compression), the mask is created based on identifying connected components where the signed difference is above or below a threshold (e.g. 1/16th of the maximum pixel value) and the area of connected components (where the difference has the same sign) is greater than a threshold (e.g. at least 4 pixels in area). Preferably, the Indicator Only Loss is invariant to small differences between the location of the indicator in the input patch and the reference patch. Invariance is one or more of invariance to small rotations, small changes in scale and small translations. In some embodiments, L1 loss (absolute value of pixel differences) is computed for multiple small changes of the location of the reference patch and the minimum of these is used as the Indicator Only Loss.

In some embodiments, 5 rotations of the reference patch are used, such that the relative X position of the top and bottom of the patch changes by −2 pixels, −1 pixels, 0 pixels, 1 pixel, and 2 pixels. In some embodiments, for each rotation, small changes in scale and small translations of the reference patch are used by choosing a crop region at certain locations and scaling the crop region to the patch size. In some embodiments, the top and bottom Y coordinates of the crop regions are the patch coordinates changed by −4, −3, −2, −1, 0, +1, +2, +3, +4 pixels. The X center coordinate is changed by −2, −1, 0, +1, +2 pixels and the width of the crop region is computed so the aspect ratio of the crop region is the same as the aspect ratio of the patch.

In some embodiments, the ranges for rotation, scale and translation could be large or smaller. In one embodiment, the ranges could be sparse, for example, the ranges can be −8, −4, −2, −1, 0, +1, +2, +3, +4, +8.

In some embodiments, when computing the L1 loss, small pixel differences are ignored. For example, a constant (e.g. 10% of the maximum pixel value difference) is subtracted from the absolute value of the pixel differences and any result that is less than zero is set to zero.

For Erase domain, the Indicator Only Loss is zero.

The Total loss is the weighted sum of Adversarial and Classification Losses, (CycleGAN) L1 loss, Face L1 loss and Indicator only loss. In one embodiment, the same weights for the Adversarial and Classification Losses and (CycleGAN) L1 Loss are used and the Face L1 Loss and Indicator only loss use the same weight as the (CycleGAN) L1 Loss.

In some embodiments, the training data for training the GAN consists of real images of gauges with human created ground truth (i.e. human annotations) and masks. In some cases, this data might use gauges that were not part of an industrial machine but instead were electrically or mechanically controllable to realize training data creation. In other embodiments, synthetic Computer Graphics Imagery (CGI) of gauges where ground truth and masks are created automatically can be used.

FIG. 15 is a table illustrating the training cases for the GAN image model in some embodiments. Referring to FIG. 15, the table illustrates StarGAN training with 2 domains—erase and draw and four training cases: draw-erase, draw-draw, erase-draw, erase-erase.

Machine Learning Model for Computer Vision Training

With the training data set generated using the synthetic images, the machine learning model for computer vision can be now be trained to detect and recognize the gauge being monitored. As described above, the computer vision training is performed in accordance with the specific computer vision model used. Training data consists of the synthetic images and ground truth information (e.g. corresponding indicator location, indicator value and/or above/below threshold(s)).

The training data includes the synthetic images that are generated by the training module using the image model and the geometric model. In some embodiments, the training data uses synthetic images from one gauge. Alternately, the training data can use synthetic images from more than one gauge (e.g. for 10 or 100 or 1000 gauges). In some embodiments, the training data also includes actual images of the gauge to be monitored with human ground truth. For example, if the computer vision makes a mistakes that is noted by a human, ground truth for corresponding image can be collected and this image and ground truth can be used for training in the future.

In some embodiments, the training data also includes negative data, that is, images that do not contain gauges or where the gauge is not visible or not readable. Regions of interest can be cropped from camera images at locations that do not include gauges. This kind of negative data can be useful for training the computer vision to detect if the camera is not correctly pointed at a gauge. Furthermore, regions of interest can be cropped from camera images at locations that partially or fully contain gauges and the indicator can be obscured (e.g. by pasting images of fingers, heads or other objects, a random crop from camera images of a region that does not have a gauge, a solid color such as white to simulate glare). This kind of negative data can be useful for training the computer vision to detect if the gauge cannot be read because the indicator is obscured. The training data may also include regions of interest from camera images where the gauge is obscured or not readable. The training data can also include other images, such as images from available test sets. For example, images from The PASCAL Visual Object Classes Challenge 2007 (VOC2007) can be used. This kind of negative data can be useful for training the computer vision to detect when the camera is not observing a gauge.

For some computer vision, it is advantageous to use many training images (e.g. 1,000 images or 10,000 images). In one embodiment, one or more batches of gauges (e.g. 100 gauges) are trained periodically (e.g. every workweek night where at least one new gauge was submitted for training on the corresponding work day). If there are few newly submitted gauges than the batch size, previously trained gauges are used. In addition to gauge images, training data includes negative images (e.g. 1 negative image for each gauge image).

Figure 16:
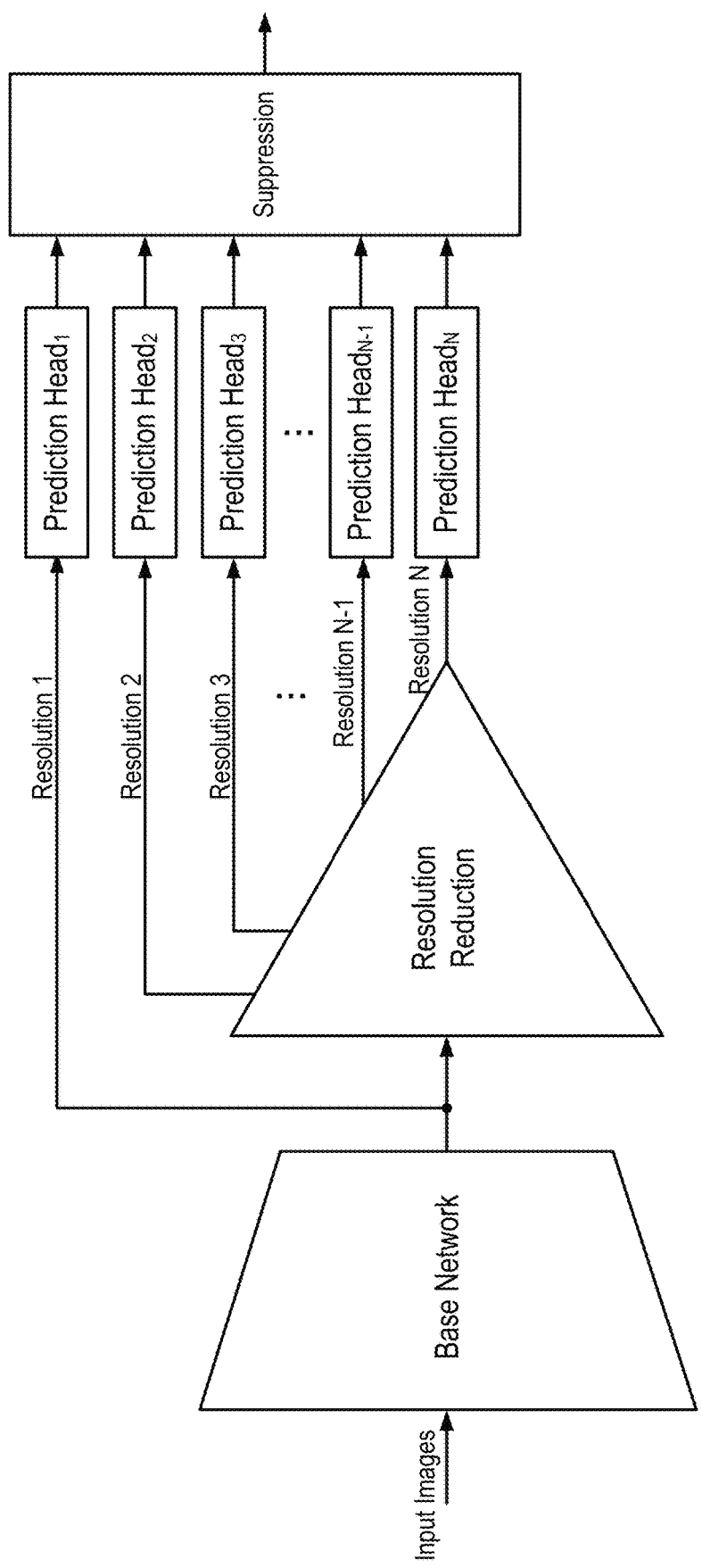
FIG. 16 illustrates the detect/recognize module in the machine learning based computer vision system in some embodiments.

FIG. 16 illustrates the detect/recognize module in the machine learning based computer vision system in some embodiments. Referring to FIG. 16, in some embodiments, detect/recognize module is a neural network that is an object detector or similar neural network. The detect/recognize module can be implemented using any appropriate computer vision detection/recognition/identification/classification technology. The detect/recognize module can be neural network based or other techniques can be used, such as Support Vector Machine (SVM). An example object detector is Single Shot Multibox Detector (SSD).

In one embodiment, the input image to the detect/recognize module is an image patch of 300×300 pixels or 600×600 pixels. The Base Network converts an input image into the finest features (at Resolution 1), e.g. a 38×38 grid of features. In one embodiment, the Base Network is an existing, pre-trained network (e.g. Google MobileNet or Google MobileNet v2). Furthermore, in some embodiment, the existing, pre-trained Base Network is used as is or is fine-tuned during computer vision training. In some embodiments, the base network may be trained from scratch.

Resolution Reduction converts the output of the Base Network to coarser features, (at Resolution 2 . . . Resolution N), e.g. 19×19, 10×10, 5×5, 3×3 and 1×1 grids of features. Alternatively, if only the 1×1 grid of features is used, fully connected layers (e.g. 3) can be used as resolution reduction.

Zero or more Prediction Heads are connected to each grid point output of the Base Network and Resolution Reduction. Each resolution has the same number of Prediction Heads per grid point at that resolution. In some embodiments, each resolution either has zero or one Prediction Heads. Alternatively, following SSD, there is one or more Prediction Heads per grid point for each resolution, where each Prediction Head corresponds to an "anchor box" which is a size/aspect ratio. For example, the 39×39 grid output of the Base Network, and 19×19, 10×10, 5×5, 3×3 and 1×1 grid outputs of features from Resolution Reduction are connected to Prediction Heads, for a total of 39×39+19×19+10×10+5×5+3×3+1×1=2017 grid points. Alternatively, only the 1×1 (coarsest) grid of features is connected for a total of one grid point. Alternatively, only the output of the Base Network and the 1×1 (coarsest) grid of features are connected to Prediction Heads. If the Base Network is a 39×39 grid, there would be 39×39+1=1522 total grid points.

The Prediction Heads can output one or more of the following:

(1) an object confidence of for each class: for example, at 1×1 resolution, the confidence that the ROI contains a gauge (a visible and readable gauge);

(2) a location, encoded as a difference between an anchor box or grid center point and an object: for example, at 1×1 resolution, coarse location of the Gauge, the location of the bounding of the scale's circle, the location of the bounding of the half circle of scale's circle containing the scale. In other examples, at 39×39 resolution, fine X,Y coordinates of maximum and minimum points of the scale; at 1×1 resolution, coarse X,Y coordinates of indicator; at 39×39 resolution, fine X,Y coordinates of indicator; at 1×1 resolution, coarse X,Y coordinates of one or more thresholds (which may be fixed thresholds or input thresholds); at 39×39 resolution, fine X,Y coordinates of one or more thresholds (which may be fixed thresholds or input thresholds).

(3) above/below threshold for one or several known thresholds (e.g. 2 thresholds): for example, at 1×1 resolution.

(4) above/below based on input threshold or thresholds: for example, at 1×1 resolution.

(4) indicator value: for example, at 1×1 resolution

Preferably, the Prediction Heads have more than one output to ease training on limited data, to enable checking for consistency and to provide information for understanding and debugging the computer vision performance.

The location information is ROI dependent, i.e., the location information is dependent on camera position and zoom and image cropping and scaling. Threshold and value information is ROI independent. In some embodiments, for detect/recognize module, the system is insensitive to modest changes in camera position and zoom and image cropping and scaling, Prediction Heads output both ROI dependent information and ROI independent information, the classifier is trained with sufficient data to learn both ROI dependent information and ROI independent information.

Following SSD, Suppression is Non-Maxima Suppression (NMS) and less confident detections are not output when there is a more confident detection that overlaps. If the Prediction Head outputs a Fine location for the indicator, NMS can suppress the output of all less confident detections so there is only one. If the Prediction Head outputs a Fine location for the minimum range point and the maximum range point, NMS can suppress the output of all less confident detections so only one for minimum and one for maximum.

In other embodiments, Suppression is a model for consistency among multiple outputs. One or more (or all) of the following pairs can be checked: coarse indicator location and fine indicator location; coarse gauge location and fine gauge location; gauge location and indicator location; value and indicator location; value and a known threshold.

For example, if the Euclidian distance between the coarse indicator location and the fine indicator location is more than a threshold (e.g. 10% of the maximum dimension of the ROI), this pair is inconsistent. For fine locations, if there are multiple detections, inconsistent detections can be suppressed. If any of the pairs are inconsistent, the output is not-readable or not-visible. If there is only one Prediction Head at the 1×1 resolution, Suppression is not used.

In some embodiments, Suppression checks that the object box for the whole gauge is inside the ROI by at least a threshold (e.g. 5 pixels) and suppress cases where the camera view is not strictly larger than the gauge. In some embodiments, Suppression checks that the object box for the whole gauge is at least a minimum size (e.g. gauge width >=50% of ROI width and gauge height >=40% of ROI height) and suppresses cases where the gauge is too small in the camera view.

The output of the detect/recognize module is the outputs of predictions heads that are not suppressed (and not-readable/not-visible for the case all outputs are suppressed due to lack of consistency).

Figure 17:
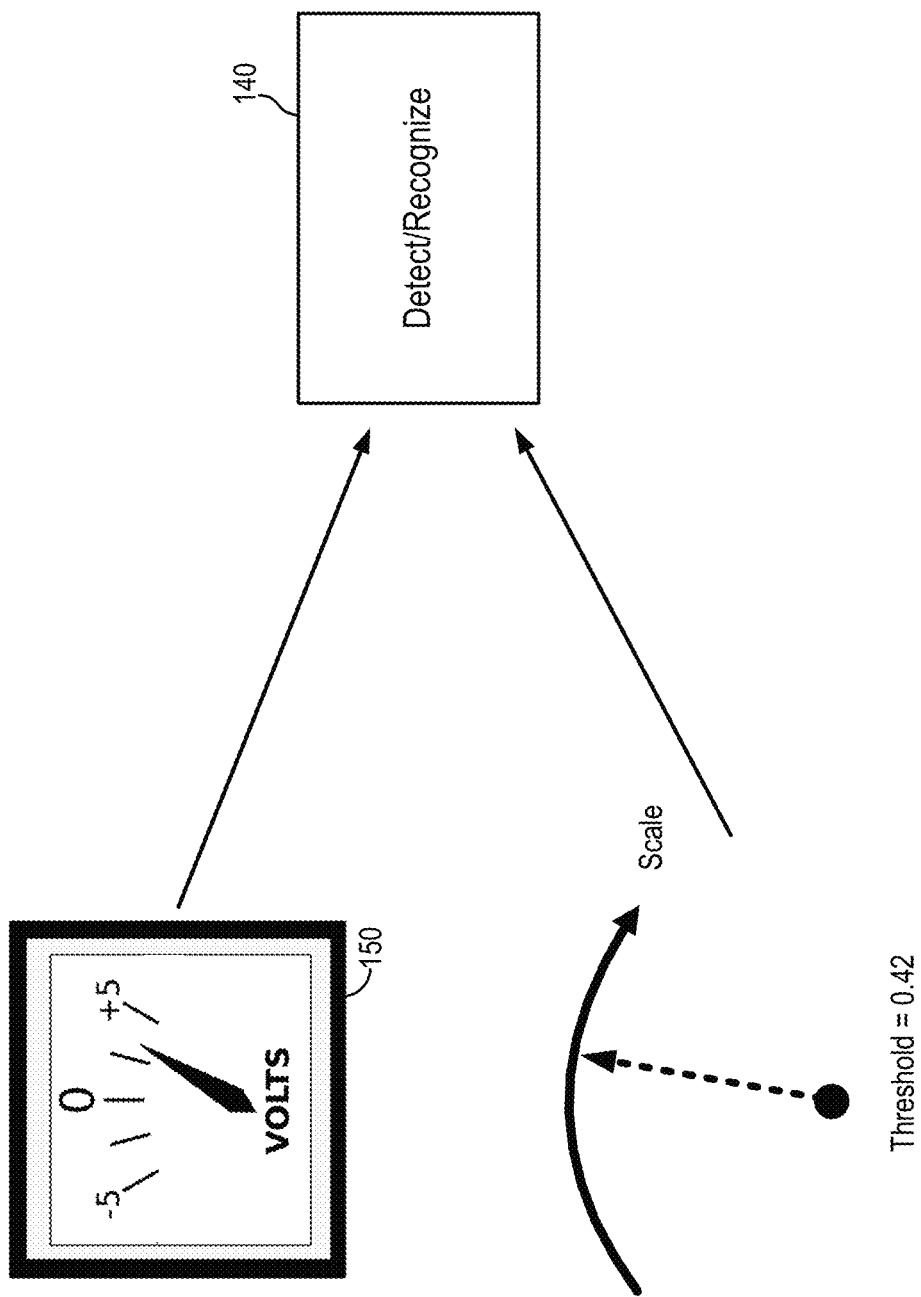
FIG. 17 illustrates applying a threshold condition to the detect/recognize module of the computer vision module in some embodiments.

FIG. 17 illustrates applying a threshold condition to the detect/recognize module of the computer vision module in some embodiments. Referring to FIG. 17, an input threshold can be provided to the detect/recognize module for training and inference. For example, the input threshold can be applied to every input image. The threshold can be provided as a gauge value (e.g. a value between 0.0 and 1.0). In other example, the threshold can be provided as an actual image of the gauge with the indicator at the threshold position. In yet another example, the threshold can be provided as a synthetic image created as part of training data generation with the indicator at the threshold position. In another example, the threshold can be provided as binary image with one value for pixel locations above the threshold and the other value for pixel locations below the threshold. The threshold information thus provided is not required to be aligned with the input gauge image.

In some embodiments, for each threshold the user annotates, the detect/recognize module also trains nearby thresholds. For example, the detect/recognize module can train a threshold for the input threshold value, a threshold for −5% of the input threshold value and a threshold for +5% of the input threshold value, for a total of three thresholds per the input threshold value. In alternate embodiments, the detect/recognize module is trained for one or more fixed thresholds. In some cases, the detect/recognize module can be trained to use both a threshold input and use a fixed threshold. In other cases, the detect/recognize module can be trained to use multiple threshold inputs that represent the threshold differently.

Figure 18:
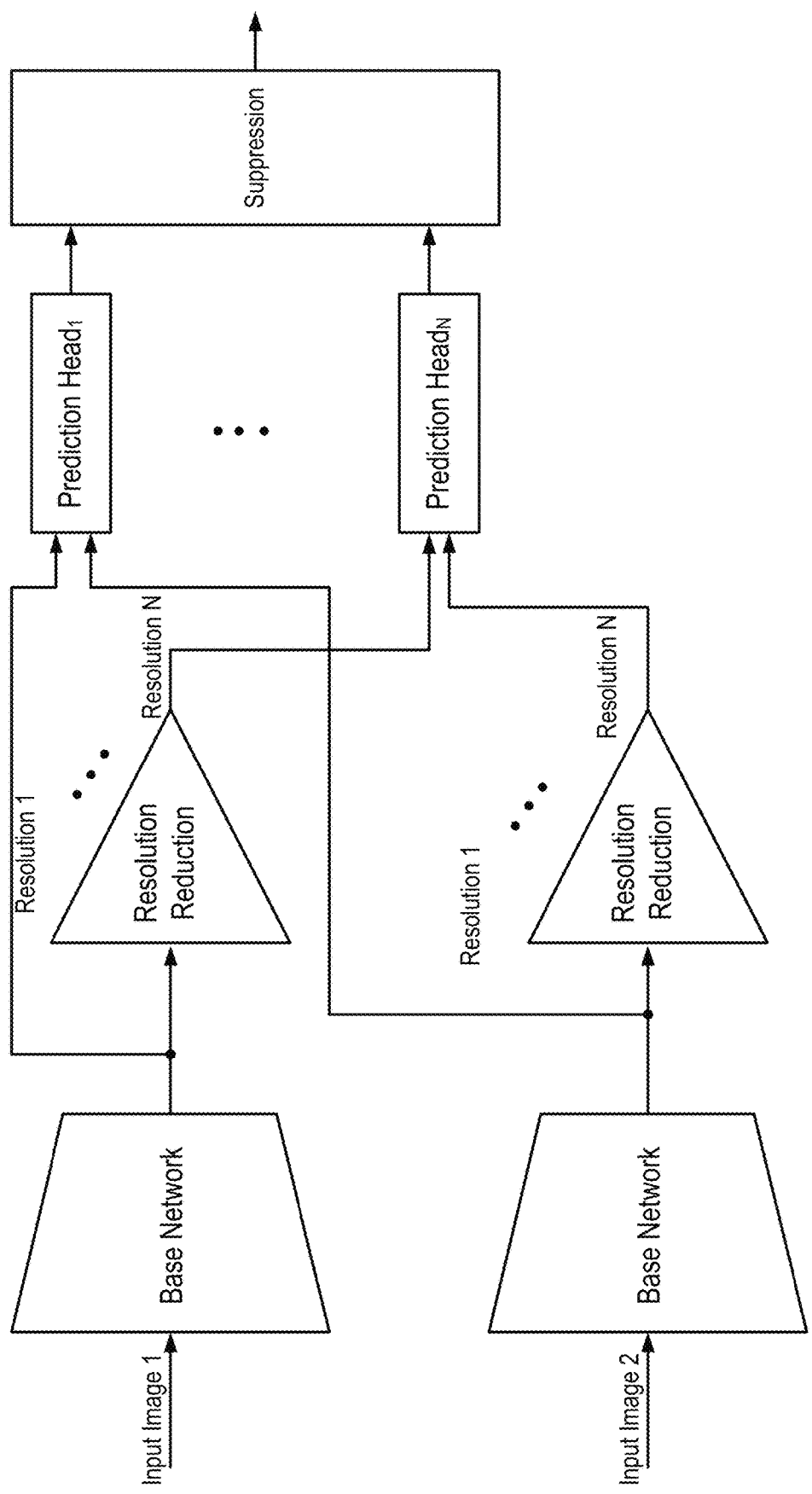
FIG. 18 illustrates the detect/recognize module incorporating threshold input in the machine learning based computer vision system in some embodiments.

FIG. 18 illustrates the detect/recognize module incorporating threshold input in the machine learning based computer vision system in some embodiments. Referring to FIG. 18, in embodiments where an actual or generated image is used to indicate a threshold and a pre-trained base network is used in the detect/recognize module, the same Base Network and Resolution Reduction could be used on both the input image and the threshold image and then the resulting features from both can be used by the Prediction Heads. That is, both Base Network blocks in FIG. 18 are the same. The structure in FIG. 18 can be used to detect/recognize using multiple images.

In alternate embodiments, a simpler neural network structure is used with convolution layers (e.g. 4) and fully connected layers (e.g. 3). For example, Convolutional layers are 3×3 with 2×2 Max Pooling, the first with 16 features and doubling the number of features in each successive layer. In yet another embodiment, the computer vision module may have two detect/recognize module. The first detect/recognize module is trained very quickly (e.g. 10 minutes) to test the system during initial setup. The second detect/recognize module is trained for longer (e.g. 2 hours or overnight) for long term use. In some embodiments with two detect/recognize modules, the small network (that can be trained quickly) is used at the edge to make an initial decision if the gauge has changed in the pre-processing module and the second network is used in the cloud to provide the final output of the detect/recognize module.

The invention can be implemented in numerous ways, including as a process; an apparatus; a system; a composition of matter; a computer program product embodied on a computer readable storage medium; and/or a processor, such as a hardware processor or a processor device configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided above along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The above detailed descriptions are provided to illustrate specific embodiments of the present invention and are not intended to be limiting. Numerous modifications and variations within the scope of the present invention are possible. The present invention is defined by the appended claims.

What is claimed is:

1. A method for monitoring a gauge having a face including markings denoting a scale for a parameter value being measured by the gauge and an indicator indicating a reading of the parameter value over the scale by displacement of the indicator on the face, the method comprising:
   receiving a set of training images of the gauge;
   receiving data relating to annotations of the training images of the gauge, the annotations denoting the scale and the indicator on the face of the gauge;
   generating a geometric model describing the gauge using geometric information derived from the data relating to the annotations;
   providing an image model previously trained to modify an image of a given gauge such that a gauge face is preserved while a gauge indicator is added to or removed from the image of the given gauge for any given gauge, the previously trained image model being a neural network that is trained using a mask to distinguish the gauge indicator from the gauge face for any given gauge;
   generating, using the geometric model and the previously trained image model, synthetic images of the gauge, the synthetic images having indicator at different positions relative to the scale, the synthetic images forming a training data set, wherein generating the synthetic images of the gauge comprises:
  selecting an image patch from a respective training image of the gauge as input to the previously trained image model;
  providing a reference image patch of the indicator of the gauge to the previously trained image model; and
  applying the previously trained image model to erase the indicator from or draw the indicator onto the selected image patch;
training a machine learning model for computer vision using the training data set;
receiving operation images of the gauge during normal operation of the gauge; and
applying the trained machine learning model for computer vision to the operation images to predict readings of the gauge.

2. The method of claim 1, wherein receiving the set of training images of the gauge comprises:
  receiving one to five training images of the gauge as the set of training images, each training image being annotated to denote the scale and the indicator on the face of the gauge in that training image.

3. The method of claim 1, wherein receiving data relating to annotations of the training images of the gauge comprises:
  receiving data relating to the annotations denoting at least end points of the scale and at least end points of the indicator on the face of the gauge.

4. The method of claim 3, further comprising:
  receiving data relating to the annotations denoting a point on the scale between two endpoints.

5. The method of claim 1, wherein generating a geometric model describing the gauge using geometric information derived from the data relating to the annotations comprises:
  generating the geometric model describing a geometric location of the scale on the face of the gauge and a geometric location and movement of the indicator on the face of the gauge.

6. The method of claim 1, wherein the previously trained image model is a generative adversarial network (GAN).

7. The method of claim 6, wherein selecting the image patch from the respective training image of the gauge includes selecting the image patch from the respective training image of the gauge using the geometric model.

8. The method of claim 7, wherein generating, using the geometric model and the previously trained image model, the synthetic images of the gauge further comprises:
  selecting a first image patch from a respective training image of the gauge as input to the previously trained image model, the first image patch containing the indicator of the gauge;
  applying the previously trained image model to erase the indicator from the first image patch;
  pasting the modified first image patch back onto the respective training image to generate a base image of the gauge without the indicator;
  rotating the base image in a first direction by a first number of degrees;
  selecting a second image patch from the base image of the gauge as input to the previously trained image model;
  applying the previously trained image model to draw the indicator onto the second image patch;
  pasting the modified second image patch back onto the base image to generate a synthetic image;
  rotating the synthetic image in a second direction opposite the first direction by the first number of degrees;
  providing the synthetic image as part of the training data set; and
  repeating the rotating the base image using a different values of rotation degrees to providing the synthetic image to generate a plurality of synthetic images forming the training data set.

9. The method of claim 1, further comprising:
  training the machine learning model for computer vision using training data denoting a threshold value for the gauge; and
  applying the trained machine learning model for computer vision to predict readings from operation images of the gauge as being above or below the threshold value.

10. The method of claim 1, further comprising:
  determining a time duration after receiving a first operation image; and
  in response to the time duration exceeding a first time value, generating an alarm indicating that no subsequent operation image is being received for the time duration exceeding the first time value.

11. A system for monitoring a gauge having a face including markings denoting a scale for a parameter value being measured by the gauge and an indicator indicating a reading of the parameter value over the scale by displacement of the indicator on the face, the system comprising:
  a hardware processor; and
  a memory coupled with the hardware processor, wherein the memory is configured to provide the processor with instructions which when executed cause the processor to:
    receive a set of training images of the gauge;
    receive data relating to annotations of the training images of the gauge, the annotations denoting the scale and the indicator on the face of the gauge;
    generate a geometric model describing the gauge using geometric information derived from the data relating to the annotations;
    providing an image model previously trained to modify an image of a given gauge such that a gauge face is preserved while a gauge indicator is added to or removed from the image of the given gauge for any given gauge, the previously trained image model being a neural network that is trained using a mask to distinguish the gauge indicator from the gauge face for any given gauge;
    generate, using the geometric model and the previously trained image model, synthetic images of the gauge, the synthetic images having indicator at different positions relative to the scale, the synthetic images forming a training data set, wherein to generate the synthetic images of the gauge, the instructions further cause the processor to:
      select an image patch from a respective training image of the gauge as input to the previously trained image model;
      provide a reference image patch of the indicator of the gauge to the previously trained image model; and
      apply the previously trained image model to erase the indicator from or draw the indicator onto the selected image patch;
    train a machine learning model for computer vision using the training data set;
    receive operation images of the gauge during normal operation of the gauge; and apply the trained machine learning model for computer vision to the operation images to predict readings of the gauge.

12. The system of claim 11, wherein the memory is further configured to provide the processor with instructions which when executed cause the processor to:
receive one to five training images of the gauge as the set of training images, each training image being annotated to denote the scale and the indicator on the face of the gauge in that training image.

13. The system of claim 11, wherein the memory is further configured to provide the processor with instructions which when executed cause the processor to:
receive data relating to the annotations denoting at least end points of the scale and at least end points of the indicator on the face of the gauge.

14. The system of claim 11, wherein the previously trained image model is a generative adversarial network (GAN).

15. The system of claim 11, wherein, to select the image patch from the respective training image of the gauge, the memory is further configured to provide the processor with instructions which when executed cause the processor to:
select the image patch from the respective training image of the gauge using the geometric model.

16. The system of claim 11, wherein the memory is further configured to provide the processor with instructions which when executed cause the processor to:
train the machine learning model for computer vision using training data denoting a threshold value for the gauge; and
apply the trained machine learning model for computer vision to predict readings from operation images of the gauge as being above or below the threshold value.

17. A non-transitory computer readable medium storing instructions which, when executed by a computer, cause the computer to:
receive a set of training images of a gauge;
receive data relating to annotations of the training images of the gauge, the annotations denoting a scale and an indicator on a face of the gauge;
generate a geometric model describing the gauge using geometric information derived from the data relating to the annotations;
provide an image model previously trained to modify an image of a given gauge such that a gauge face is preserved while a gauge indicator is added to or removed from the image of the given gauge for any given gauge, the previously trained image model being a neural network that is trained using a mask to distinguish the gauge indicator from the gauge face for any given gauge;
generate, using the geometric model and the previously trained image model, synthetic images of the gauge, the synthetic images having indicator at different positions relative to the scale, the synthetic images forming a training data set, wherein to generate the synthetic images of the gauge, the instructions further cause the computer to:
select an image patch from a respective training image of the gauge as input to the previously trained image model;
provide a reference image patch of the indicator of the gauge to the previously trained image model; and
apply the previously trained image model to erase the indicator from or draw the indicator onto the selected image patch;
train a machine learning model for computer vision using the training data set;
receive operation images of the gauge during normal operation of the gauge; and
apply the trained machine learning model for computer vision to the operation images to predict readings of the gauge.

18. The non-transitory computer readable medium of claim 17, wherein the instructions further cause the computer to:
receive one to five training images of the gauge as the set of training images, each training image being annotated to denote the scale and the indicator on the face of the gauge in that training image.

19. The non-transitory computer readable medium of claim 17, wherein the previously trained image model is a generative adversarial network (GAN).

20. The non-transitory computer readable medium of claim 17, wherein, to select the image patch from the respective training image of the gauge, the instructions further cause the computer to:
select the image patch from the respective training image of the gauge using the geometric model.

* * * * *